(12) United States Patent
Wickham et al.

(10) Patent No.: US 7,584,467 B2
(45) Date of Patent: Sep. 1, 2009

(54) SOFTWARE UPDATING SYSTEM AND METHOD

(75) Inventors: Robert T. Wickham, Sammamish, WA (US); Vinay Deo, Redmond, WA (US); Shafqat U. Khan, Redmond, WA (US); Shantanu Sardesai, Sammamish, WA (US); Adam D. Welker, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 538 days.

(21) Appl. No.: 10/662,720

(22) Filed: Sep. 15, 2003

(65) Prior Publication Data

US 2004/0187103 A1  Sep. 23, 2004

Related U.S. Application Data

(60) Provisional application No. 60/455,197, filed on Mar. 17, 2003.

(51) Int. Cl.
*G06F 9/44* (2006.01)

(52) U.S. Cl. ........................... 717/171; 717/176

(58) Field of Classification Search .......... 717/168–178
See application file for complete search history.

(56) References Cited

U.S. PATENT DOCUMENTS

| | | | |
|---|---|---|---|
| 5,493,682 A | 2/1996 | Tyra et al. |
| 5,752,042 A | 5/1998 | Cole et al. |
| 5,805,891 A | 9/1998 | Bizuneh et al. |
| 5,978,911 A | 11/1999 | Knox et al. |
| 5,999,740 A | 12/1999 | Rowley |
| 6,006,034 A | 12/1999 | Heath et al. |
| 6,009,274 A | 12/1999 | Fletcher et al. |
| 6,074,434 A | 6/2000 | Cole et al. |
| 6,110,228 A | 8/2000 | Albright et al. |
| 6,123,737 A | 9/2000 | Sadowsky |
| 6,151,643 A | 11/2000 | Cheng et al. |
| 6,282,709 B1 | 8/2001 | Reha et al. |
| 6,353,926 B1 | 3/2002 | Parthesarathy et al. |
| 6,360,366 B1 | 3/2002 | Heath et al. |
| 6,763,403 B2 | 7/2004 | Cheng et al. |
| 6,976,251 B2 | 12/2005 | Meyerson |
| 6,986,134 B1 | 1/2006 | Foster |
| 7,003,767 B2 | 2/2006 | Larkin |
| 2002/0078222 A1 | 6/2002 | Compas et al. |
| 2002/0100036 A1 | 7/2002 | Moshir et al. |
| 2002/0174422 A1 | 11/2002 | Kelley et al. |
| 2003/0097579 A1 | 5/2003 | England et al. |

(Continued)

OTHER PUBLICATIONS

Pawlak, "Software Update Service to Ease Patch Distribution", http://www.directionsonmicrosoft.com/sample/DOMIS/update/2002/05may/0502sustep.htm, pp. 1-6, A1-A7, Apr. 22, 2002.*

(Continued)

*Primary Examiner*—Ted T Vo
(74) *Attorney, Agent, or Firm*—Lee & Hayes, PLLC

(57) ABSTRACT

In one embodiment, software updates are applied to one or more client computers. The one or more client computers are assigned a level of service governing aspects of the application of the updates. The scheduling of the application of the software updates is done according to the level of service. The application of the software update is then performed according to the schedule.

39 Claims, 16 Drawing Sheets

U.S. PATENT DOCUMENTS

| | | | |
|---|---|---|---|
| 2003/0191958 | A1 | 10/2003 | Gartside et al. |
| 2004/0003266 | A1 | 1/2004 | Moshir et al. |
| 2004/0068481 | A1 | 4/2004 | Seshadri et al. |
| 2004/0205709 | A1 | 10/2004 | Hiltgen et al. |

OTHER PUBLICATIONS

IBM, "RS/6000 ATM Cookbook", Redbook.ibm.com, pp. i-x, 1-307, 2000.*

Barry, Evelyn, Ph.D., , "Software Evolution, Volatility and Lifecycle Maintenance Patterns: A Longitudinal Analysis Synopsis," Mays Business School, Texas A&M University, IEEE Computer Society, 2002, pp. 474-477.

Orso, Alessandro et al., "A Technique for Dynamic Updating of Java Software," College of Computing, Georgia Institute of Technology, IEEE Computer Society, 2002, pp. 649-658.

Shirabad, Jelber Sayyad, et al., "Supporting Software Maintenance by Mining Software Update Records," School of Information, Technology & Engineering, University of Ottawa, Ottawa, Ontario, Canada, IEEE Computer Society, 2001, pp. 22-31.

Bialek, Robert Pawel, "The Architecture of a Dynamically Updatable, Component-based System," Work-in-progress Report, Mar. 2002, Dept. of Computer Science, University of Copenhagen, Copenhagen, Denmark, IEEE Computer Society, pp. 1012-1016.

The Institute of Electrical and Electronics Engineers, Inc., "IEEE Standard for Software Quality Assurance Plans," Copyright 1998, title pp. i-vi and pp. 1-15.

Waqar, Umer, et al., "A Formal Approach for Software Maintenance," Proceedings of the International Conference on Software Maintenance (ICSMO2), 2002 IEEE, 10 pages.

Manufacturing Engineering, Tech Front, "Windows-Based Software Update," Feb. 1996, pp. 28-30.

Muller, "Focus on Open View a Guide to Hewlett-Packard's Network and Systems Management Platform", 1995, pp. 1-307.

"PatchLink Update 4.0 White Paper Cross-platform Security Patch Managment", PatchLink Corportion, 2002, pp. 1-18.

SafePatch, "SafePatch Version 0.9 User Manual", Mar. 1999, pp. 55.

Tulisalo, et al., "Upgrading to Lotus Notes and Domino 6", IBM, Dec. 22, 2002, pp. 24.

Barry, "Software Evolution, Volatility and Lifecycle Manitenance Patterns: A Longitudinal Analysis Synopsis", Mays Business School, Texas A&M University, IEEE, 2002, pp. 474-477.

Bialek, "The Architecture of a Dynamically Updatable, Component-based System", Dept of Computer Science, University of Copenhagen, Work-in-progress Report, IEEE, Mar. 2002, pp. 1012-1016.

"IEEE Standard for Software Quality Assurance Plans", Software Engineering Standards Committee of the IEEE Computer Society, IEEE, 1998, title page plus pp. 1-15.

Orso, et al., "A Technique for Dynamic Updating of Java Software", College of Computing, Georgia Institute of Technology, IEEE, 2002, pp. 649-658.

Shirabad, et al., "Supporting Software Maintenance by Mining Software Update Records", School of Information Technology & Engineering, University of Ottawa, Ottawa, Canada, IEEE, 2001, pp. 22-31.

"Tech Front", Manufacturing Engineering, Feb. 1996, pp. 28 and 30.

Waqar, et al., "A Formal Approach for Software Maintenance", Proceedings of the International Conference on Software Maintenance (ICSM 2002), IEEE, 2002, 10 pages.

* cited by examiner

SOFTWARE UPDATING SYSTEM AND METHOD

RELATED APPLICATIONS

This application claims the benefit of U.S. Provisional Application No. 60/455,197, filed Mar. 17, 2003, entitled "Software Updating System and Method", which is hereby incorporated by reference. This application also claims the benefit of U.S. application Ser. No. 10/385,391, filed Mar. 10, 2003 and still pending, entitled "Software Updating System and Method", which is hereby incorporated by reference.

TECHNICAL FIELD

The disclosure relates to installation of software updates.

BACKGROUND

A very large number of software applications, programs and files used by computers need periodic updates, which are frequently referred to a "patches". Many updates are of vital importance, such as those having to do with security or application functionality.

Installing and maintaining software within an enterprise network environment is a major cost to corporations and organizations. This is particularly the case where large numbers of networked computers are involved, each computer having a large number of programs and each program having a large number of possible revision levels. As the number of computers within a network increases, and the number of files, programs and associated versions of the files and programs on each computer also increases, it becomes progressively harder to maintain each computer in a condition that maximizes security and functionality.

Additionally, workstation down time is increasingly an issue, due in part to the time required to reboot computers after application of an update. The known process by which client computers are updated has created time consuming cycles during which updates are applied and the computer is rebooted. Accordingly, productive time is lost.

Moreover, the IT technician is not provided with any metrics describing important data related to the time that updates become available, the time such updates become approved, and the time taken to fix such hazards by installing an update. Consequently, the progress toward the goal of timely application of all updates is not well understood or aggressively pursued at present.

SUMMARY

In one embodiment, software updates are applied to one or more client computers. The one or more client computers are assigned a level of service governing aspects of the application of the updates. The scheduling of the application of the software updates is done according to the level of service. The application of the software update is then performed according to the schedule.

BRIEF DESCRIPTION OF THE DRAWINGS

The following detailed description refers to the accompanying figures. In the figures, the left-most digits(s) of a reference number identifies the figure (Fig.) in which the reference number first appears. Moreover, the same reference numbers are used throughout the drawings to reference like features and components.

DETAILED DESCRIPTION

Figure 1:
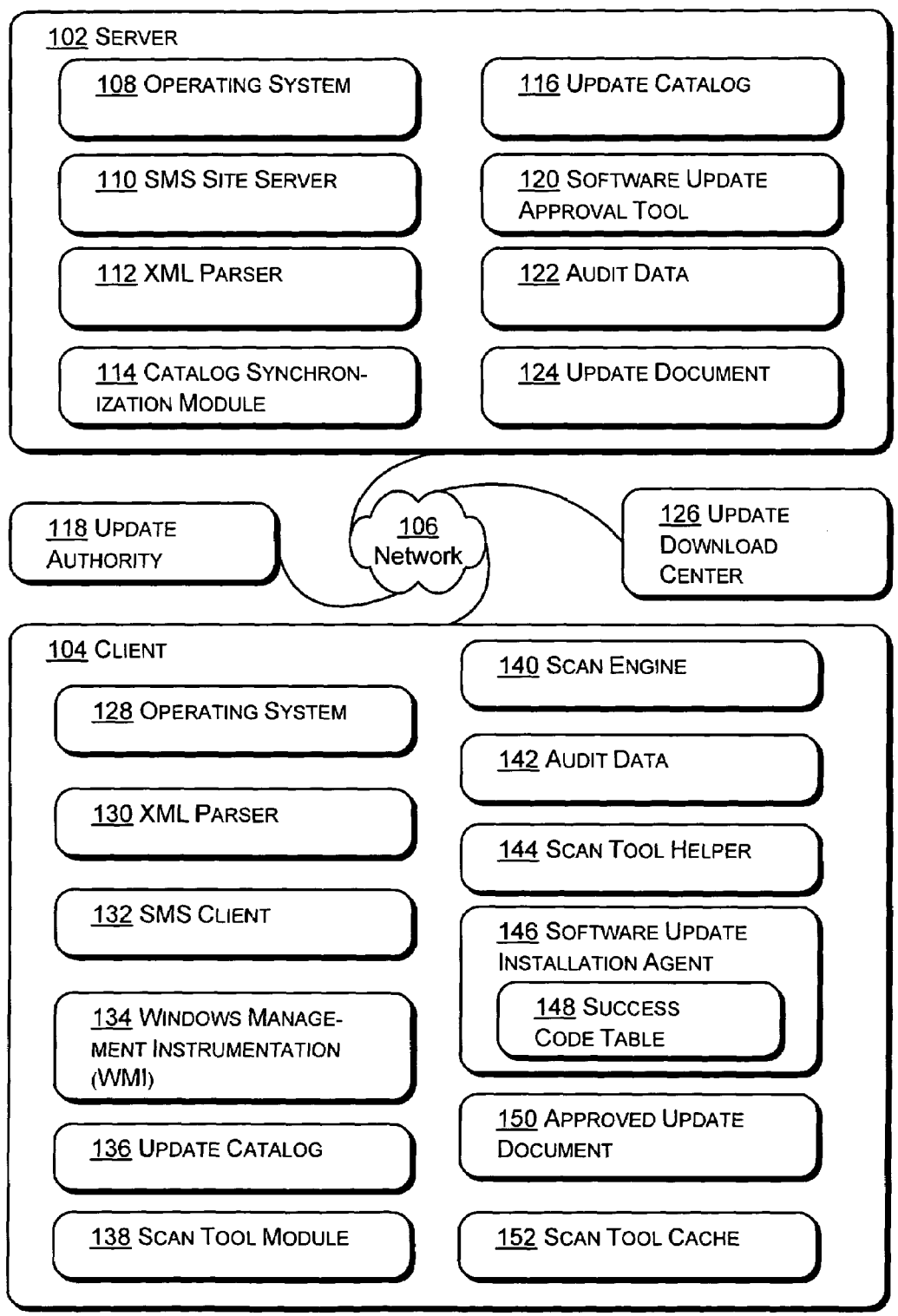
FIG. 1 is a block diagram describing the configuration of an exemplary software updating system.

FIG. 1 shows a network environment within which an exemplary software updating system 100 may operate. A server 102 is connected to a client 104 by any type of network 106, such as the Internet or an intranet within an enterprise. The server 102 is typically configured with an operating system 108. Software configured for asset inventory, software distribution and infrastructure security, such as Microsoft Systems Management Server (SMS) site server 110 or similar product may also be present. Additionally, an XML parser 112 is installed.

A catalog synchronization module 114 allows the server 102 to obtain an update catalog 116 from an update authority 118. The update catalog 116 may be configured as an XML document, and includes information about the availability of software updates ("patches") and the version of the software to which they should be applied. Additionally, the update catalog 116 may include complex rules, typically in the form of Boolean logic, which prescribes the conditions under which individual software updates should be installed. In an over-simplified example, the rules may indicate that an update should be installed if the target application is greater than revision 2, but only if revision 4 of another program is present. The update authority 118 may be a trusted software source, such as Microsoft Corporation, wherein the trusted software source maintains information concerning software updates.

Therefore, the catalog synchronization module 114 is configured to communicate with the update authority 118, to maintain the resident copy of the update catalog 116 in current form. Additionally, the catalog synchronization module 114 is configured to check for a code (an "authenticode") to determine if the update catalog 116 is authentic, or has been corrupted, tampered with or otherwise rendered useless or harmful.

An exemplary software update approval tool 120 may be configured as a wizard to guide a user (such as an IT (information technology) technician) on the server 102 through the deployment of software updates on one or more client computers 104. In particular, the software update approval tool 120 is configured to allow the user to approve or reject application of software updates for installation on one or more client computers 104, wherein the updates were recommended by audit data 122 received from the client 104. Information disclosing the file configuration on the client—including file versions present and the present update level—is obtained from audit data 122 which was transferred from the client to the server via SMS, as will be seen in greater detail below.

Figure 2:
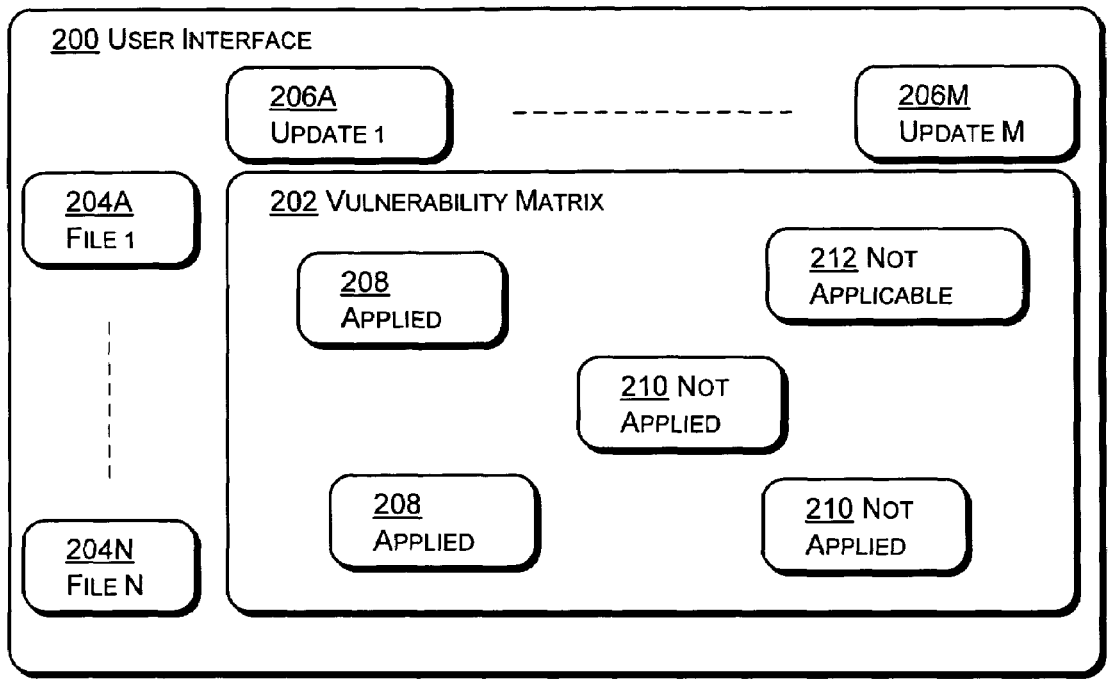
FIG. 2 is a diagram that describes the structure and operation of a vulnerability matrix.

In one embodiment of the software update approval tool 120, the approval process may involve presenting the user with a user interface 200, such as that seen in FIG. 2. By viewing the user interface, the IT technician may understand in detail the vulnerabilities facing each client computer 104 on an enterprise network. In an optional configuration, a vulnerability matrix 202 showing the update status for a client computer 104 is present. The matrix 202 may be configured by arraying representations 204A-204N of the files present on the particular client on one axis, and representations 206A-206M of the updates (patches) associated with the files 204 on another axis. The matrix 202 includes representations 208 indicating that a given update was applied to a given file; representations 210 indicating that the update was not applied to the file; and representations 212 indicating that the update is not applicable to the file. By viewing the vulnerability matrix 202, the user may appreciate the vulnerabilities associated with a file present on the client computer 104, as well as whether the vulnerabilities have been eliminated or mitigated by application of the update(s) associated with the file.

Returning to FIG. 1, the software update approval tool 120 allows the IT technician on the server 102 to approve updates for application to the client 104. The software update approval tool 120 is configured to, upon approval of an update, locate and obtain a copy of required updates 124. Accordingly, such approved updates 124 may be obtained by the approval tool 120 from a download center 126. Information on the location of the download center, such as a URL (uniform resource locator) may be obtained from the update catalog 116. Updates obtained for a client may then be replicated to the client using SMS 110 or other software distribution technology.

An exemplary client 104 is configured with an operating system 128 and XML parser 130. SMS client software 132 or similar asset inventory and software distribution software and WMI 134 (Windows® management instrumentation) software 134 or similar are also installed.

A copy of the update catalog 136, received from the server 102 via SMS, provides information regarding the relationship between files potentially present on the client and updates which may need to be installed on those files. A scan tool 138 is configured to call a scan engine 140. Where the scan engine 140 is a program, the scan tool 138 invokes the program. Where the scan engine has been advantageously configured as an API (application programming interface) the scan tool 138 calls the API.

The scan engine 140 is configured to read the update catalog 136, which is typically in the form of an XML document, using the XML parser 130. The scan engine 140 is then configured to query the operating system 128, to determine the exact revision level of programs and/or files present on the client 104. The scan engine 138 may base each query in part on the outcome of previous queries and on the rules—typically expressed as Boolean equations—within the update catalog 136. Accordingly, the scan engine 140 is configured to determine the file type and revision level of all relevant files on the client 104, and additionally to determine the updates that are applicable to the files found. When completed, this information becomes audit data 142.

The scan tool 138 is configured to save the audit data 142 into a queryable interface with the server 102. WMI 134 is such an interface, and a preferred scan tool 138 is configured to save the audit data 142 into WMI 134 and to provide an indication to the SMS client 132 that will cause the audit data 142 to be replicated to the server 102, where it may be aggregated with the audit data of other clients at 122.

A scan tool helper 144 may be configured separately or as part of the scan tool 138. The scan helper 144 manages the process of merging the results of the audit data 142 with service level data. Such service level data may be reflected in modifications to the Win32_PatchState schema or similar data structure. In an exemplary environment, modification to the Win32_PatchState schema may include the addition of fields including: string AuthorizedName (name of the update), datetime TimeDetected; datetime TimeApplied, and datetime TimeAuthorized. Field TimeDetected records the time at which an available update is discovered, thereby implying a time at which a potential security breach is detected. Field TimeAuthorized records the time at which the server 102 (i.e. the IT department administration) authorized the application of the update. Accordingly, the time required by the IT department to act can be derived by comparing the TimeDetected from the TimeAuthorized. Field TimeApplied records the time at which the update was applied, and is an overall measure of the responsiveness of the IT department, and is also a measure of the IT department's responsiveness in installing the update after authorizing the update. Using these modifications to the Win32_PatchState schema, the scan tool helper 144 is able to generate the above service level data associated with TimeDetected, TimeAuthorized and TimeApplied.

A software update installation agent 146 is configured to install the approved update(s) 150 sent by the server 102 via SMS or similar distribution application. In a preferred embodiment, the software update installation agent 146 is configured to call the scan engine 140. The scan engine 140 is configured to again evaluate the files on the client 104 with respect to the update catalog 136, which contains information on updates available, files needing updates, and rules for determining the which updates apply to which files. The output of this second scan—current audit data—of the client's files is put into the scan tool cache 152. The software update installation agent 146 is configured to use the scan tool cache 152 to prevent the installation of updates that are no longer warranted. The installation of updates may become unwarranted, such as in the circumstance where changes in the client computer's file system have occurred more recently then the transmission of the audit data 142 to the server 102. Examples of such a change include installing an updated version of a program, thereby replacing the earlier version which needed an update.

A preferred software installation agent 146 is configured to review the exit codes generated by the installation of the updates 150. A success code table 148 is configured to map a wide variety of initial exit codes into an output exit code that more correctly reflects the underlying meaning of the initial exit code. While zero is traditionally used to indicate a successful update install, and other numbers enumerate different potential errors, this is nomenclature is not always accurate. In some cases, non-zero exit codes indicate a satisfactory update installation due to situations unforeseen by the author of the update or the update installation technology. Such situations include factors related to the software configuration on a particular client. Accordingly, the success code table 148 is configured to map the exit codes generated by the installation of updates into exit codes which more accurately reflect the situation which caused generation of the exit code and provide consistency in success code or exit code meaning.

In particular, differences between exit codes that were generated by different install engine technology may exist. For example, Windows® Installer, Update.EXE and I-Express may not be in complete agreement on the precise meaning of a given exit code. Accordingly, the success code table 148 may be configured to map success codes in any desired manner, such as to map numerically different codes having the same meaning into a consistent numeral, thereby resulting in consistent success code interpretation. Subsequent to exit code consideration, those items resulting in immediate availability will be re-scanned to confirm their availability. Items which result in a computer reboot shall have their availability confirmed by re-scanning immediately following the reboot.

In some cases, identification of an update's association with a particular install engine technology provides sufficient information to map the success codes associated with the update. In other circumstances, the success code table 148 must be edited by an IT professional to reflect a special case associated with an particular update. Accordingly, the success code table 148 is editable, configurable and extensible, and can be modified to allow mapping of the success codes generated by any update's installation process into a consistent meaning.

Figure 3:
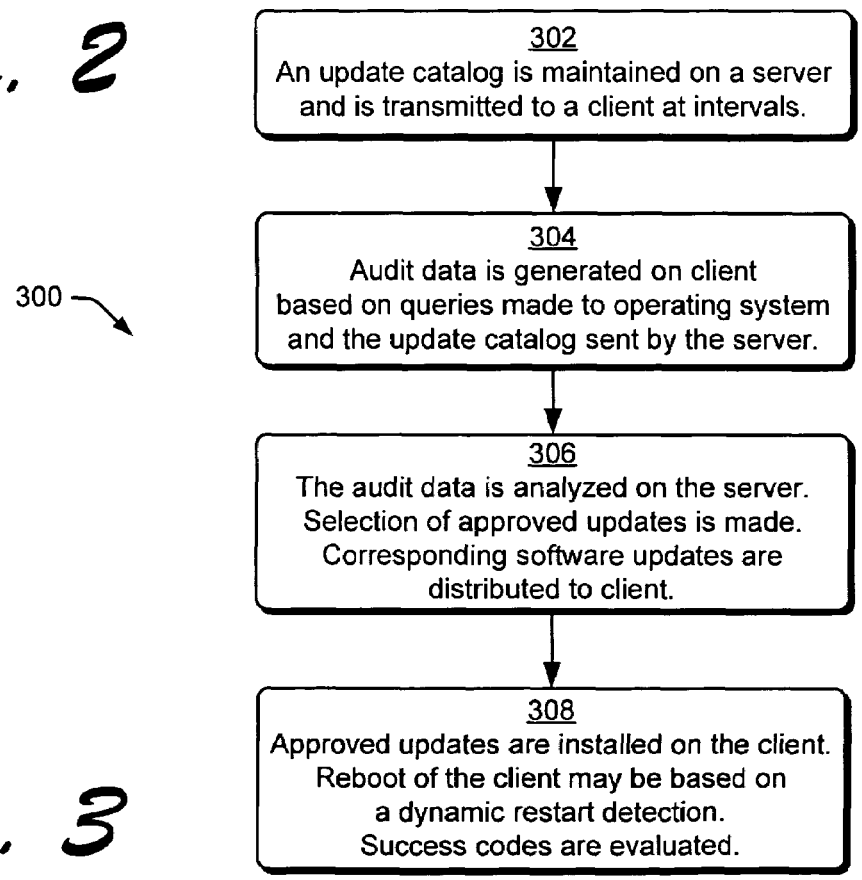
FIG. 3 is a flow diagram that describes the operation of an exemplary software updating system.

FIG. 3 is a flow diagram that describes an exemplary method 300 by which the software updating system 100 may be operated. At block 302, an update catalog 116 is maintained on the server 102 by a catalog synchronization module 114 or similar. As a part of the maintenance of the update catalog 116, the catalog synchronization module 114 downloads a fresh copy of the update catalog at regular intervals. Each time the update catalog 116 is downloaded, the synchronization module 114 checks applicable codes to determine if the catalog downloaded is authentic. All or any relevant part of the update catalog 116 may be sent at regular intervals to the client 104 for storage at 136.

At block 304, audit data 142 is generated on the client 104 based on queries made to the operating system 128 and based on information from the update catalog 136. The audit data 142 may be generated under the direction of a scan tool 138 by operation of a scan engine 140. The audit data 142 can include an inventory of files within the client computer's file system which need updates and an indication of the applicable update for each file.

At block 306, the audit data 142 may be aggregated with the audit data of other clients on the server 102 in an audit data library 122. The audit data is analyzed, such as by a software update approval tool 120, to determine if each update should be installed. The approved updates are then sent to the appropriate client by SMS or other means.

At block 308, the approved updates 150 are installed on the client 104. The installation process may be performed by a software update installation agent 146 or similar procedure. The scan tool cache 152 is consulted to prevent the installation of updates for which there is no longer a need. Changes in the need for an update could be related to the recent installation of a newer version of a program, for example. The client may be rebooted after installation of one or more updates. The decision to reboot may be governed by dynamic restart detection, as seen in greater detail in FIG. 10. Success codes resulting from the update installation may be mapped according to the success code table 148, as seen in greater detail in FIG. 11. Success code information is utilized in the creation of service level data, which can be used, for example, to provide feedback to a corporate IT department. Such service level data can include time measurements between availability of an update and authorization of the update by the IT department and between availability and installation of the update.

Figure 4:
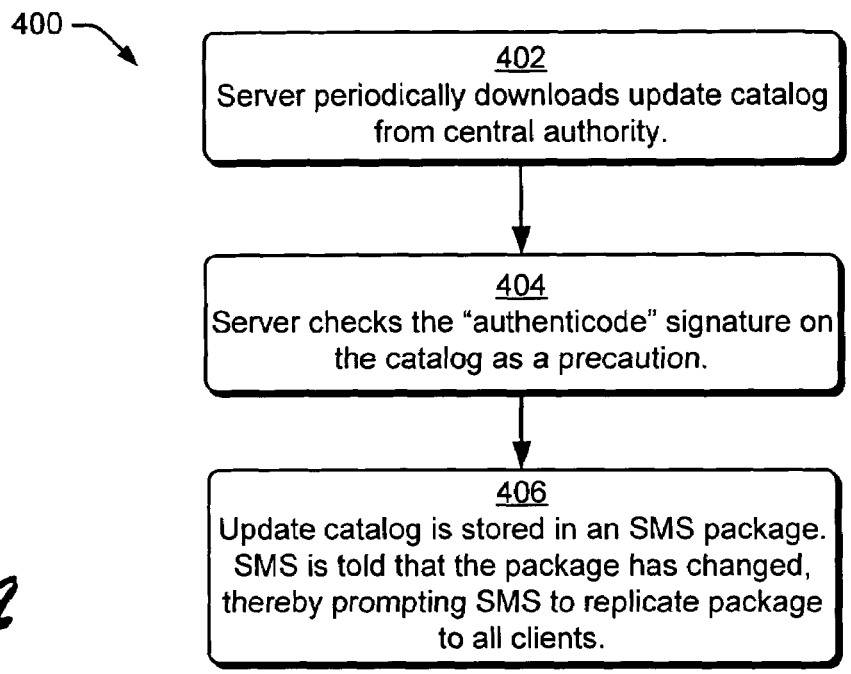
FIG. 4 is a flow diagram that describes the operation of an exemplary catalog synchronization module on a server.

FIG. 4 is a flow diagram that describes an exemplary method 400 by which the catalog synchronization module 114 may be operated, thereby more fully explaining the operation of block 302 of FIG. 3.

At block 402, the server 102 periodically downloads an update catalog 116 from an update authority. The download may be managed by the catalog synchronization module 114 or similar structure, thereby maintaining the copy of the update catalog 116 in a current condition. The update catalog 116 is typically in the form of an XML document, and contains information about available updates, the files and file versions to which the updates apply, and rule governing such application. Due to the complexity of the rules, they may be expressed in the form of Boolean equations.

At block 404, in a typical download of the update catalog 116, the catalog synchronization module 114 checks available codes associated with the update catalog 116 as a confirmation of the catalog's authenticity.

At block 406, the update catalog 116 is stored as an SMS package. SMS is told that the package includes changes, i.e. that the package is new. Accordingly, SMS replicates the update catalog 116 to all clients 104.

Figure 5:
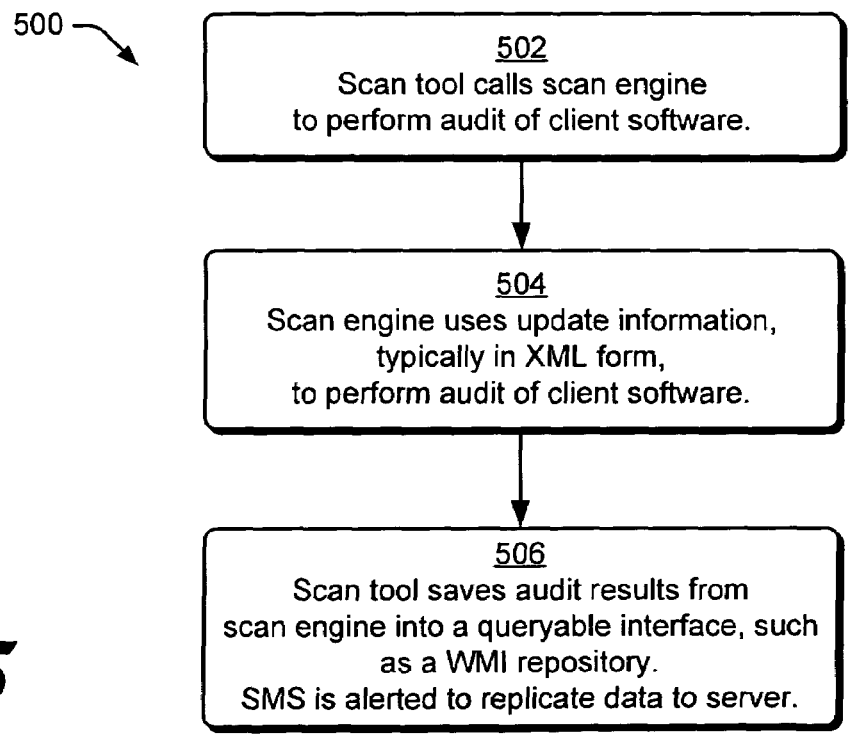
FIG. 5 is a flow diagram that describes the operation of an exemplary scan tool on a client computer.

FIG. 5 is a flow diagram that describes an exemplary method 500 by which the scan tool module 138 on the client 104 may be operated, thereby more fully explaining the operation of block 304 of FIG. 3.

At block 502, the scan tool 138 calls the scan engine 140. In an exemplary configuration, the scan engine 140 is a program that must be called. However, the scan engine 140 may advantageously be configured as an API, thereby simplifying the operation of the scan tool 138.

At block 504, the scan engine 140 uses the update catalog 136, typically in XML form, to perform the audit of the software on the client 104. This audit, described more fully with reference to FIG. 6, results in the production of audit data 122.

At block 506, the scan tool 138 saves the audit results 142 received from the scan engine 140 into a queryable interface with the server 102. In a typical application, the queryable interface with the server is WMI 134 (Windows® management instrumentation). Accordingly, the scan tool 138 populates the audit results into a WMI repository 134 on the client 104. The audit results 142 are then uploaded by SMS to the server 102, typically for storage in a library 122 with the audit results of other clients.

Figure 6:
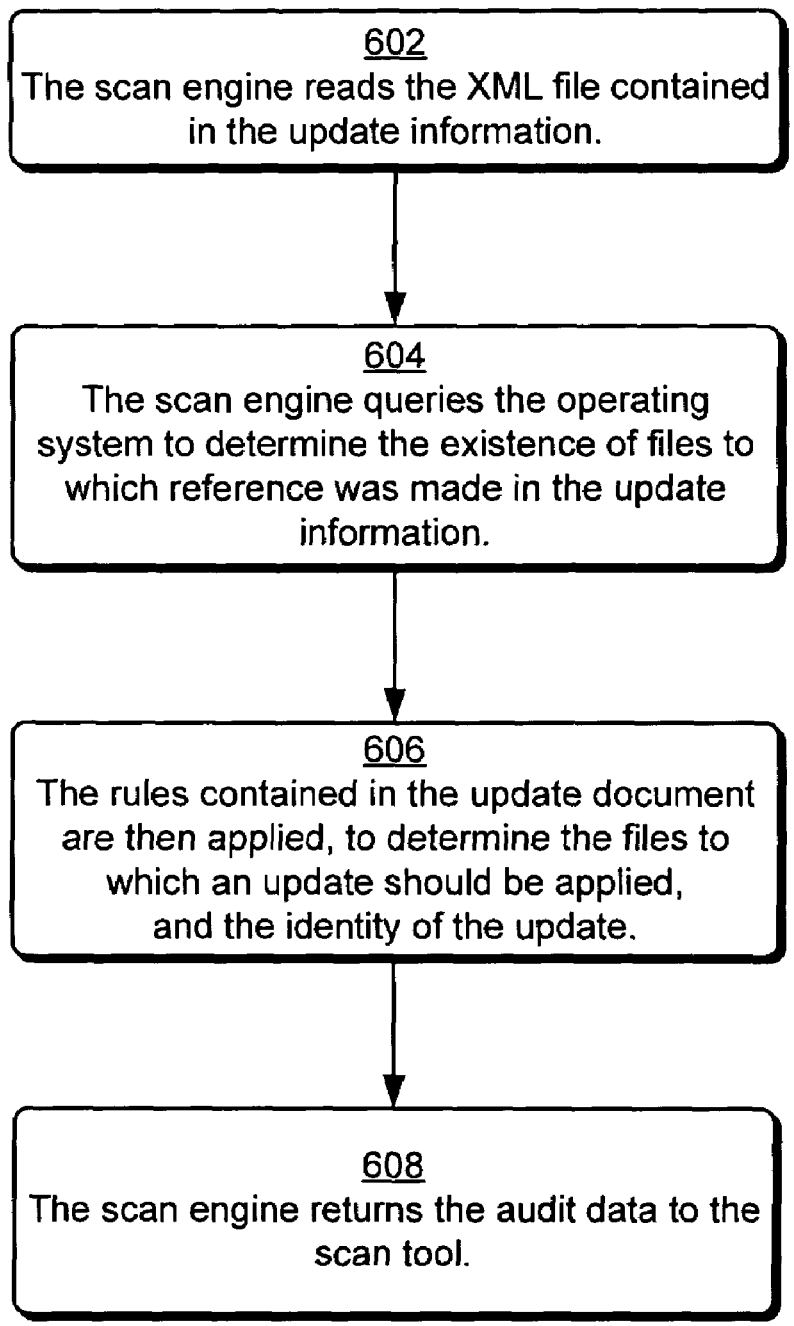
FIG. 6 is a flow diagram that describes the operation of an exemplary scan engine on a client computer.

FIG. 6 is a flow diagram that describes an exemplary method 600 by which the scan engine 140 on the client 104 may be operated, thereby more fully explaining the operation of block 504 of FIG. 5.

At block 602, the scan engine 140 reads the update document 150, which typically contains an XML document describing files, updates and associated rules of application.

At block 604, the scan engine 140 queries the operating system 128 of the client 104 to determine the existence of files to which reference was made in the update document 150. At block 606, the rules contained within the update document are then applied, thereby determining the files to which an update applies and the identity of that update.

At block 608, the scan engine 140 assembles the identities of the files needing an update and the associated updates, and returns this information to the scan tool 138 as the audit data.

Figure 7:
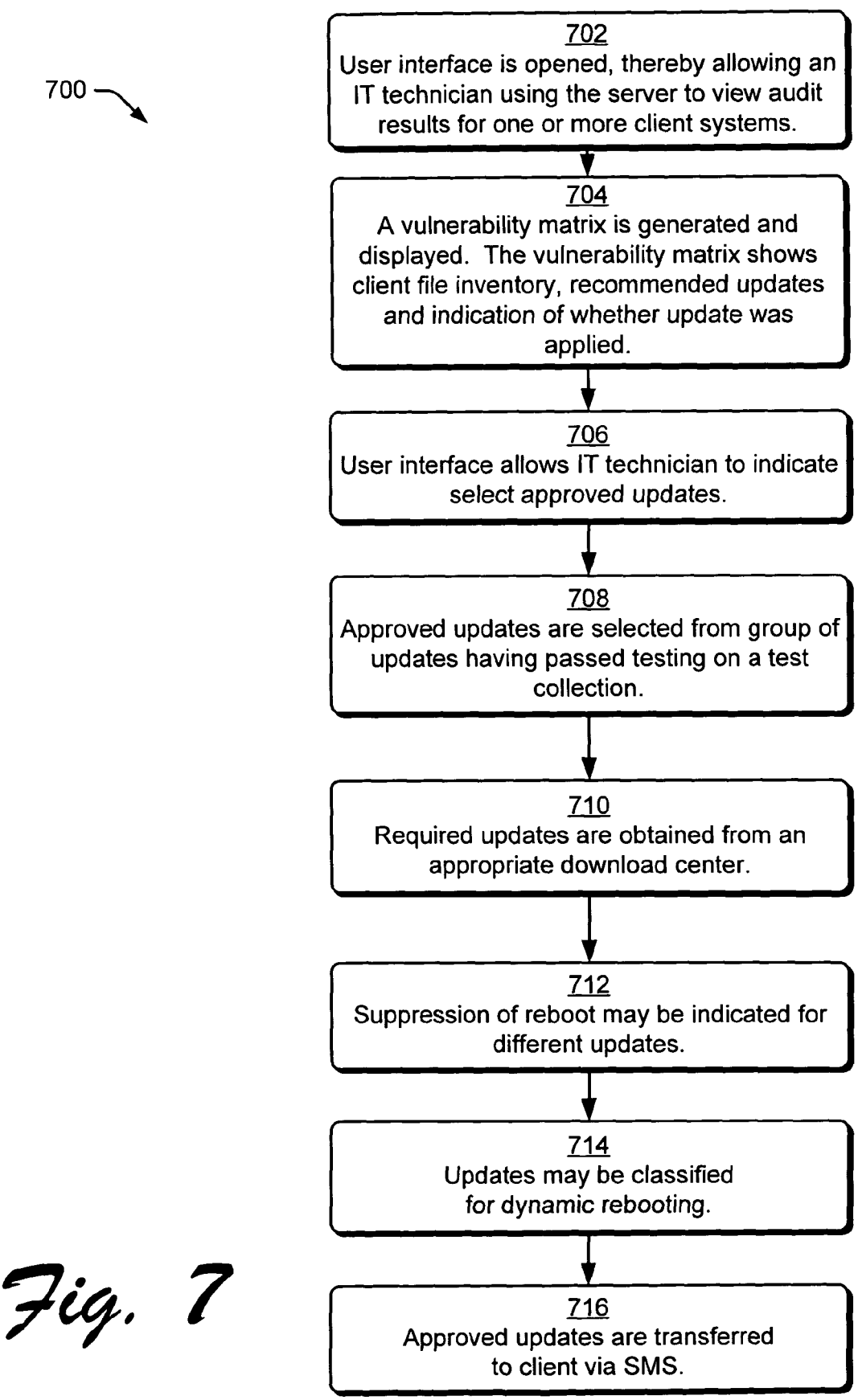
FIG. 7 is a flow diagram that describes the operation of an exemplary software update approval tool on a server.

FIG. 7 is a flow diagram that describes an exemplary method 700 by which a software update approval tool 120 may be operated on the server 102, thereby more fully explaining the operation of block 306 of FIG. 3. The exemplary method 700 allows for the selection of approved software updates, which are then replicated to the appropriate client computers for application.

At block 702, a user interface is opened, thereby allowing an IT technician using the server 102 to view audit results for one or more client systems. At block 704, optionally, a vulnerability matrix 200 is generated and displayed. The vulnerability matrix 202 shows client file inventory, recommended updates and indicates if the update has been applied. At block 706, the user interface allows the IT technician to indicate the approved updates (patches). The approval process could be presented to the user in the form of a wizard, or other applicable format. The approval could be based in part on the vulnerability matrix 200 the technician viewed. At block 708, in some applications, the user interface is restricted to allow selection of updates only from an approved group of updates having passed testing on a test collection of computers. If application of the update to the test collection of computers was successful, then the updates are included among those from which the IT professional may select for installation on a given system. In some applications, the IT professional may be challenged by the user interface to state the name of a test collection of systems upon which the update was installed in the testing process, or other details which confirm that testing was performed.

Figure 10:
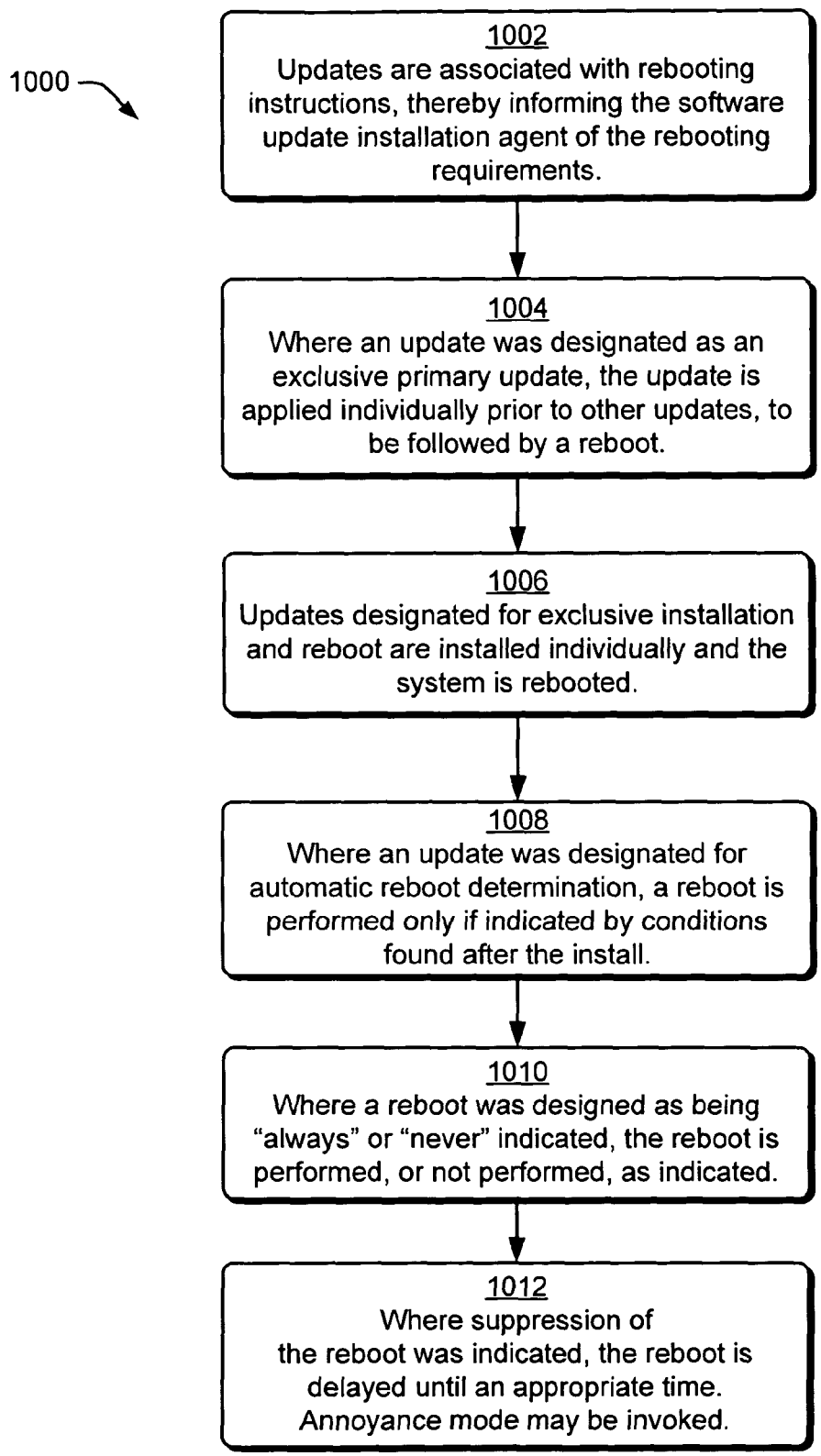
FIG. 10 is a flow diagram that describes exemplary conditions controlling rebooting a client computer.

At block 710, the approved updates 124 are obtained, perhaps from an update download center 126. At block 712, suppression of reboot may be indicated for some updates. At block 714, dynamic rebooting may be indicated for other updates. FIG. 10 discusses rebooting in greater detail. At block 716, the updates are then transferred to the appropriate client 104 via SMS or other file transfer utility.

Figure 8:
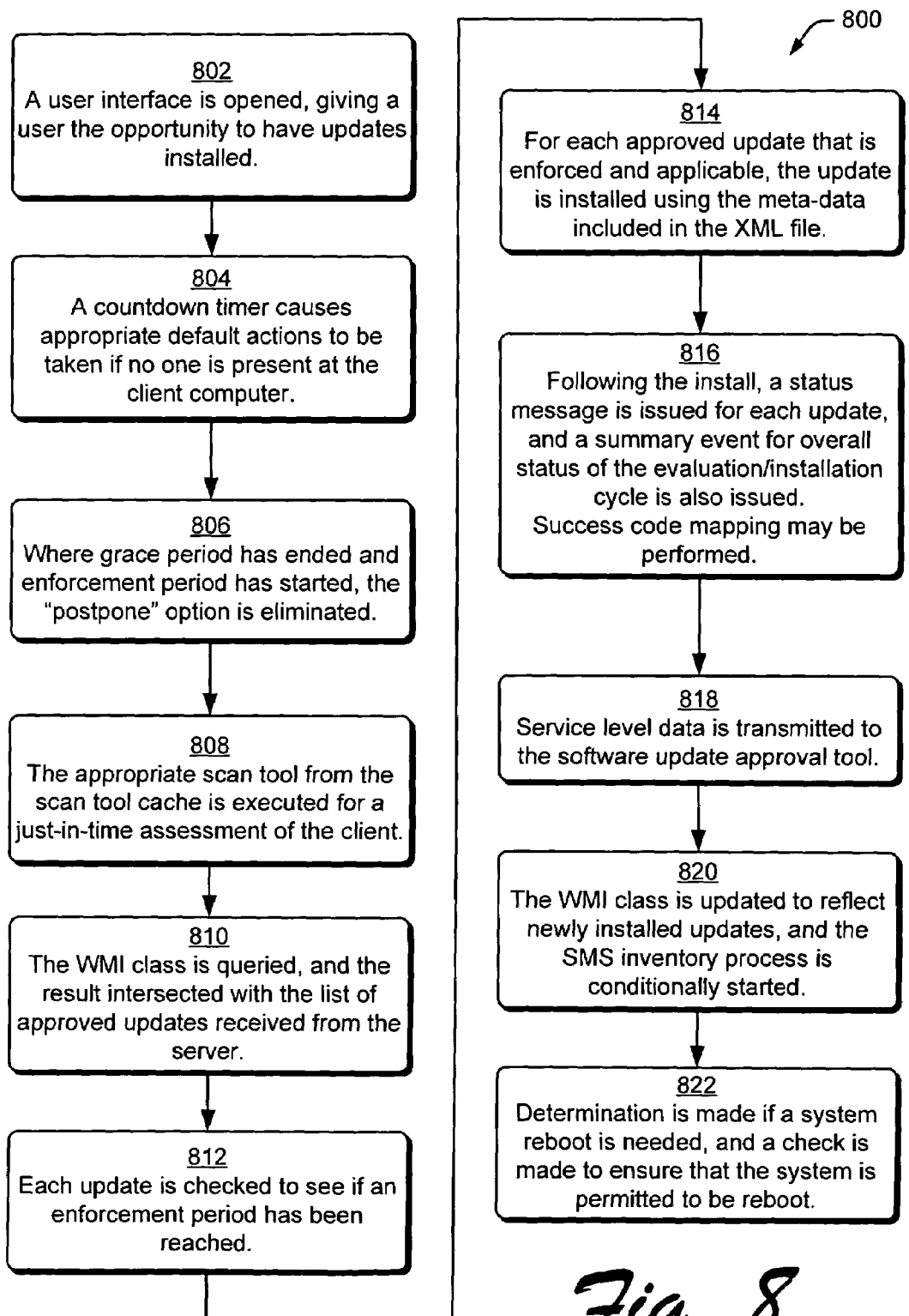
FIG. 8 is a flow diagram that describes the operation of an exemplary software update installation tool on a client computer.

FIG. 8 is a flow diagram that describes an exemplary method 800 by which a software installation agent, such as agent 146, may be operated on the client 104, thereby more fully explaining the operation of block 308 of FIG. 3. The exemplary method 800 installs the updates sent by the server 102 onto the client 104.

At block 802, a user interface may be opened on the client 104 to announce to the user the opportunity to have updates installed at this time. At block 804, where a user interface has opened, a countdown timer causes appropriate default actions to be taken upon expiration of a timed period if no one is present at the client computer. The default action may be set by the corporate IT department, and may include "install" and "postpone". Where the default is "install," the installation of the updates proceeds after the timed period has expired. Where the default action is "postpone," the installation is delayed. At block 806, where a grace period has ended and the enforcement period has started, the "postpone" option is eliminated, and may appear to be a "grayed" option on the user interface. In this circumstance, the remaining default, "install," is invoked, and the installation of the updates proceeds. The identifying name of the corporate IT department is affixed to this user interface to ensure the employee is aware of whom the computer's maintenance has been entrusted.

At block 808, the appropriate scan tool 138, 140 is executed to refresh the scan tool cache 152. By refreshing the scan tool cache 152, it can be determined if the status of files on the client 104 has changed, thereby changing the need for one or more updates to be installed. The audit results of the scan tool cache 152 may be deposited into a queryable interface, such as WMI.

At block 810, the WMI class is queried, and the results (i.e. the updates and their associated target files) are intersected with the list of approved updates received from the server. Accordingly, where WMI indicates that there is no longer a need to install a given update, or where the server did not forward an update (perhaps due to approval rejection by the IT technician) one or more updates will not be installed.

At block 812, each update to be installed is checked to determine if an enforcement period has been reached. In some cases, the IT department operating the server 102 will provide a grace period, followed by an enforcement period. During the grace period, the update can be rejected by the client. During the enforcement period, the update cannot be rejected by the client.

At block 814, for each approved update that is enforced and still applicable (in view of the scan cache), the update is installed using the meta-data included in the XML file (the update document 150).

At block 816, following install, a status message is issued for each update, and a summary message reflecting the overall status of the evaluation/installation cycle is issued. In one embodiment, the status message will observe a SuccessCodes mapping table feature, wherein mapping of non-zero exit codes into success states is allowed. Success code mapping is discussed in greater detail in the discussion of FIG. 11. At block 818, the success codes may be included in service level data, which may be transmitted to the software update approval tool 120 or other location on the server 102.

At block 820, the WMI class is updated to reflect newly installed updates, and the SMS inventory process is conditionally started. Additionally, service level data may be transmitted to the software update approval tool 120 or other location. For example, service level data may include information indicating the length of a time period between update availability and update installation.

At block 822, determination is made if a system restart is needed, and a check is made to ensure that the system is permitted to be restarted. Additional detail associated with system restarting is seen in the discussion of FIG. 10.

Figure 9:
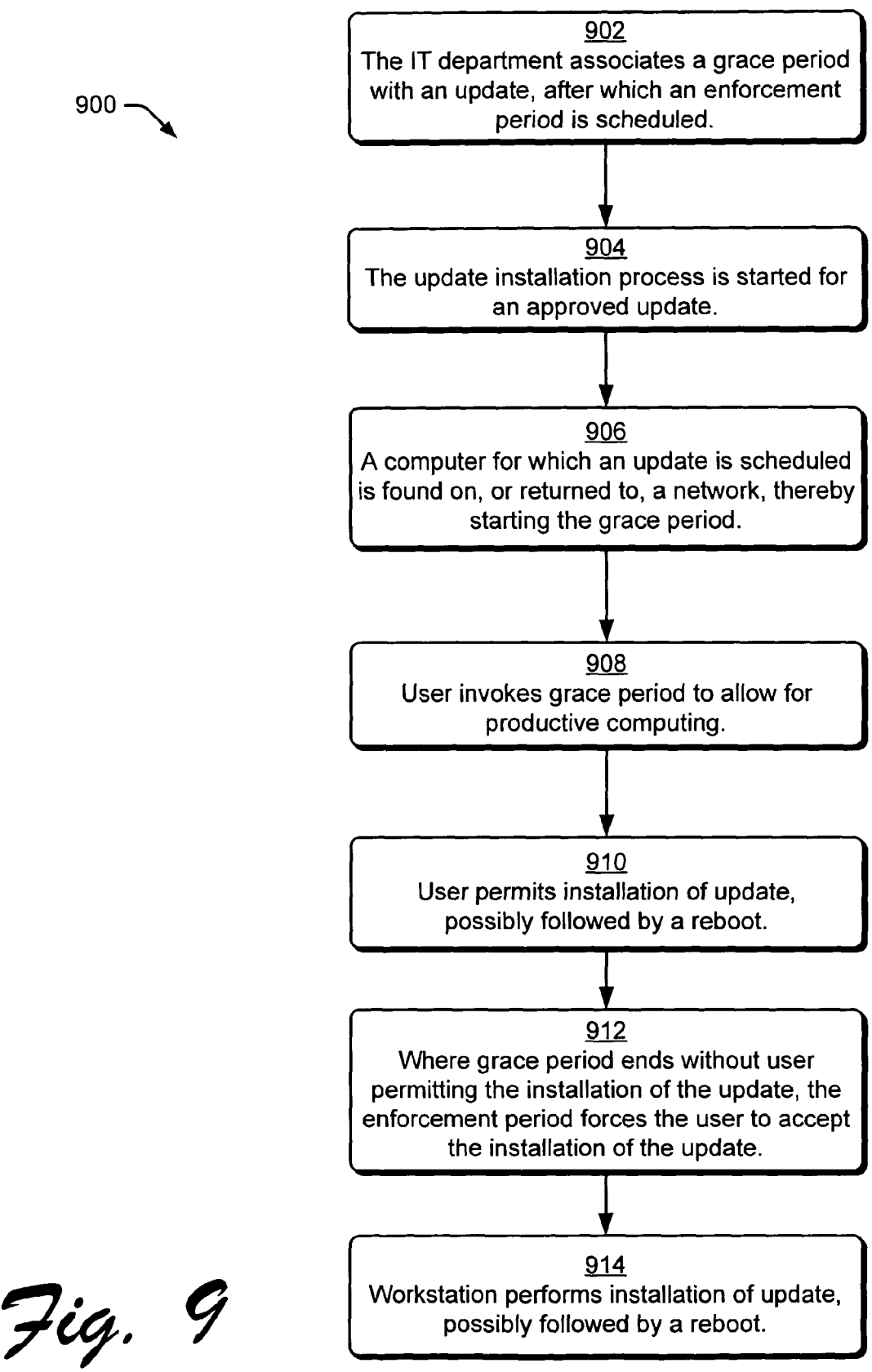
FIG. 9 is a flow diagram that describes the operation of exemplary grace periods and enforcement periods on a client computer.

FIG. 9 is a flow diagram that describes an exemplary method 900 by which grace periods and enforcement periods may be employed to balance the need to install updates with the need for knowledge workers to efficiently utilize their computers.

At block 902, the IT department associates a grace period with an update, after which an enforcement period is scheduled. At block 904, the update installation process is started for an approved update having assigned grace and enforcement periods. At block 906, a computer for which an update is scheduled is found on a network—or returned to a network, such as in the case of a laptop computer)—thereby triggering the start of the grace period. At block 908, the user may elect to invoke the grace period to delay installation of the update. This action allows the user to continue working. At block 910, optionally, the user may permit installation of one or more updates, which may be followed by a reboot. At block 912, where the grace period ends prior to permitting the installation of one or more updates, the enforcement period begins. The enforcement period forces the user to accept the installation of the update. At block 914, the update(s) is/are installed, possibly followed by a reboot.

FIG. 10 is a flow diagram that describes an exemplary method 1000 by which dynamic restart detection may be performed, thereby increasing the efficiency of the update process. At block 1002, updates may be associated with rebooting instructions, thereby informing the software update installation agent 146 of the rebooting requirements. At block 1004, where an update was designated as an exclusive primary update, the update is applied individually prior to other updates, to be followed by a reboot. Examples of such updates include service packs, which combine many updates. Application of such an update may obviate the need for other updates; accordingly, such an update should be applied first. At block 1006, updates designated for exclusive installation and reboot are installed individually and the system is rebooted. An example of such an update is a video driver, which is sufficiently important that it is preferably installed individually prior to a reboot. At block 1008 where an update was designated for automatic reboot detection, a reboot is performed only if indicated by conditions found after the install. Such conditions may include the discovery of files which are left over by updated applications, and which indicate the need for a reboot. At block 1010, where a reboot was designated as being "always" or "never" indicated, the reboot is performed or not performed, as indicated.

At block 1012, where suppression of the reboot was indicated, the reboot is delayed until an appropriate time. Where suppression is indicated, if is frequently advisable to time the application of the updates a short time before a scheduled reboot. This is particularly true where the install is being performed on a server, which may have a rigorous schedule governing system rebooting which is intended to maximize uptime.

Figure 11:
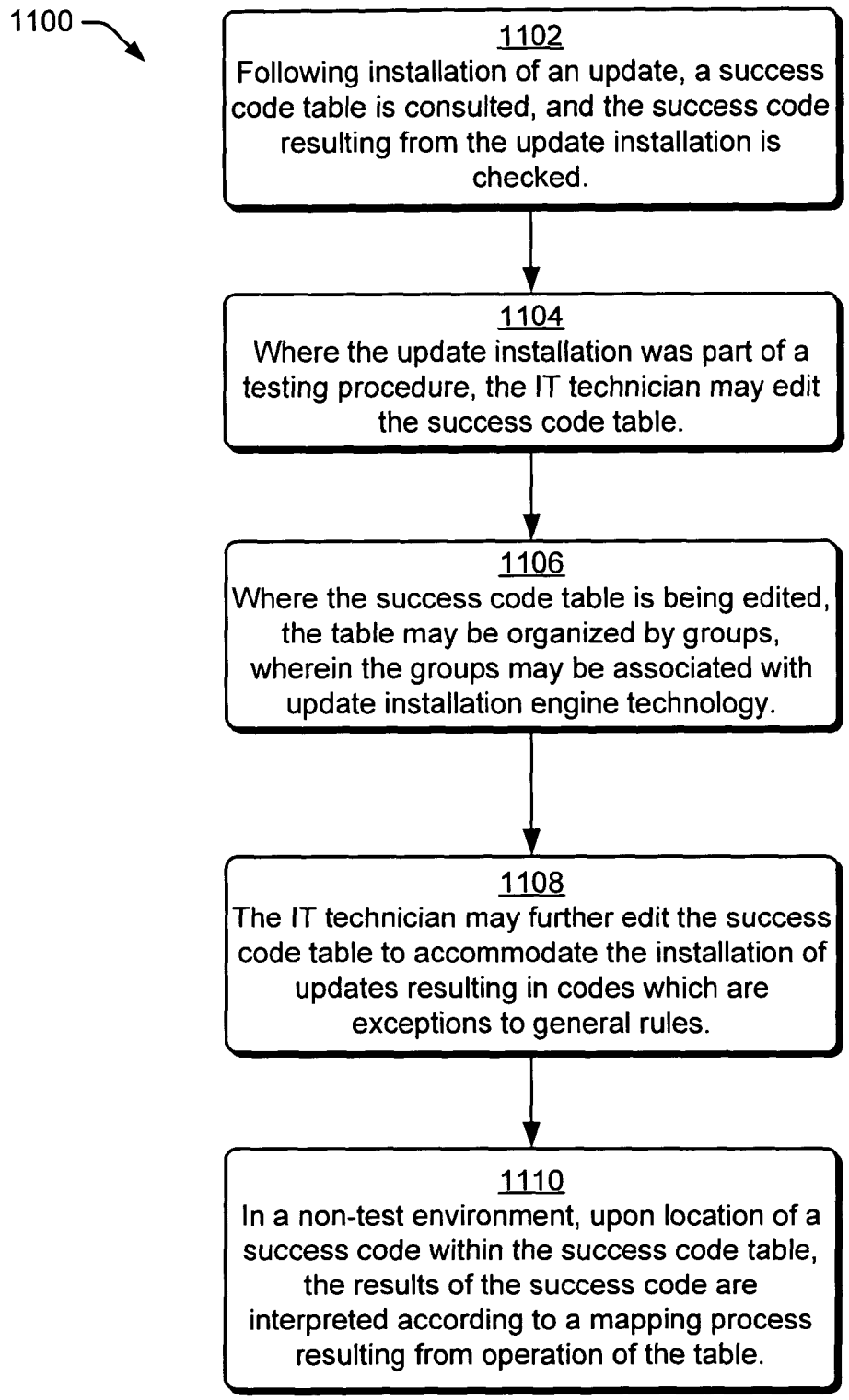
FIG. 11 is a flow diagram that describes exemplary mapping of success codes resulting from update installations on a client computer.

FIG. 11 is a flow diagram that describes an exemplary method 1100 by which a success code table 148 may be maintained, and by which success code mapping may be performed in a manner which maps success codes having misleading or inconsistent meaning to success codes having an expected and/or appropriate meaning.

At block 1102, following installation of an update, a success code table is consulted, and the success code resulting from the update installation is checked.

At block 1104, where the update installation was part of a testing procedure, the IT technician may edit the success code table 148. At block 1106, the success code table 148 may be organized by groups, where the updates in each group have success codes with similar meaning. For example, each groups of updates may be configured for installation by similar update installation engine technology. At block 1108, the IT technician may further edit the success code table to accommodate the installation of updates resulting in codes which are exceptions to general rules.

At block 1110, where the installation of the update was not associated with a testing procedure, location of the success code resulting from the installation within the success code table 148 allows mapping of the success code. Accordingly, the result of the mapping provides information that is consistent with expectations.

Figure 12:
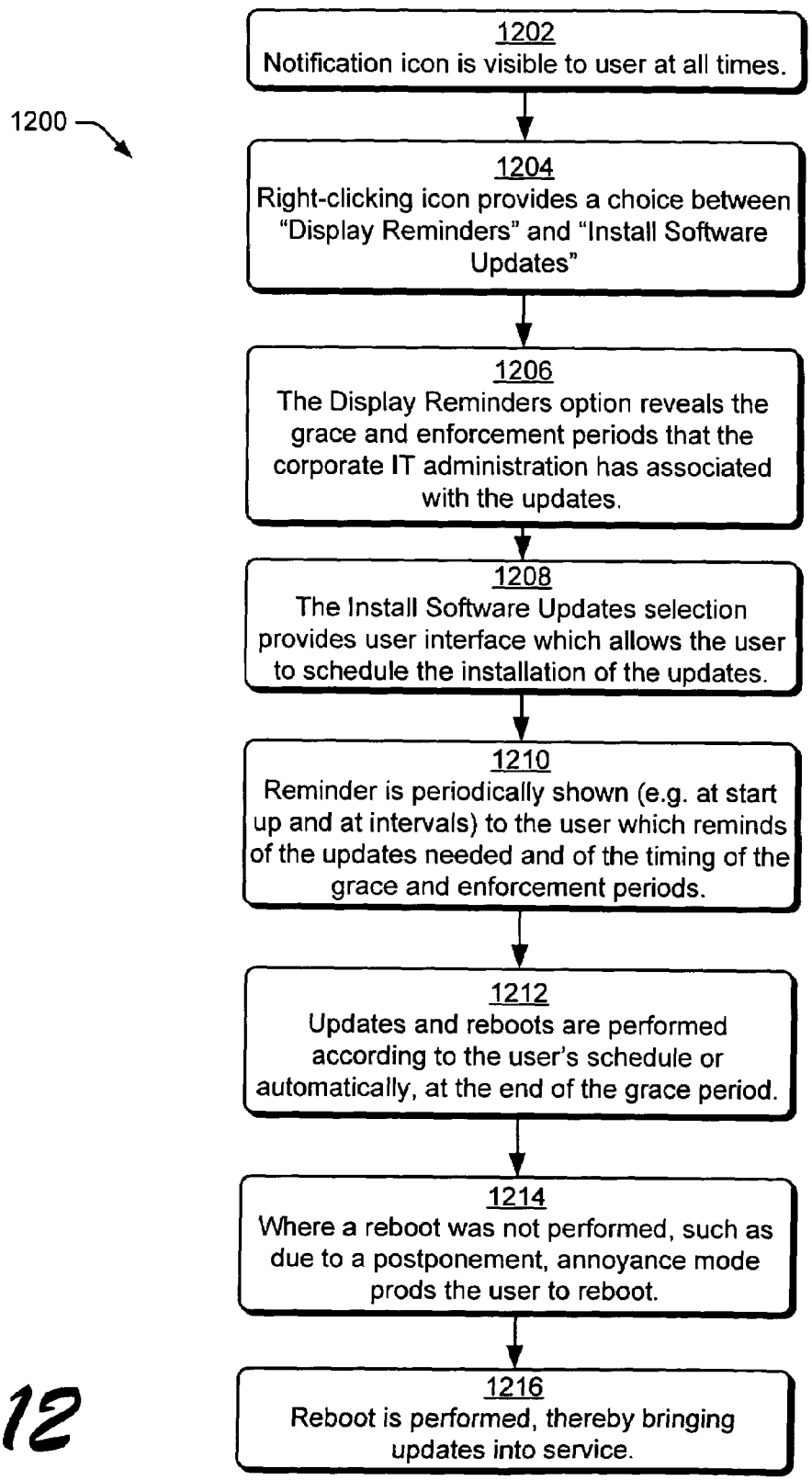
FIG. 12 is a flow diagram describing an exemplary method by which the user may be given some control over the timing of the process by which updates are installed on the user's computer.

FIG. 12 is a flow diagram describing an exemplary method 1200 by which the user may be given some control over the timing of the process by which updates are installed on the user's computer. More particularly, the method 1200 may allow the user to control the timing of the operation of the scan tool module 138, the software update installation agent 146 and/or the rebooting of the user's computer following the installation of the updates 150.

Figure 13:
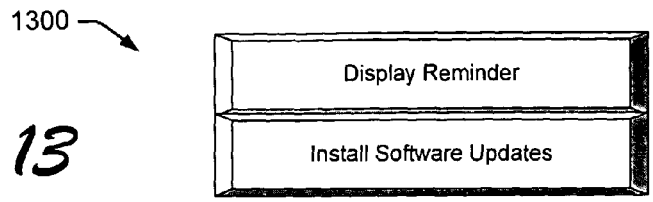
FIGS. 13 through 16 are exemplary user interfaces associated with the method of FIG. 12.
Figure 14:
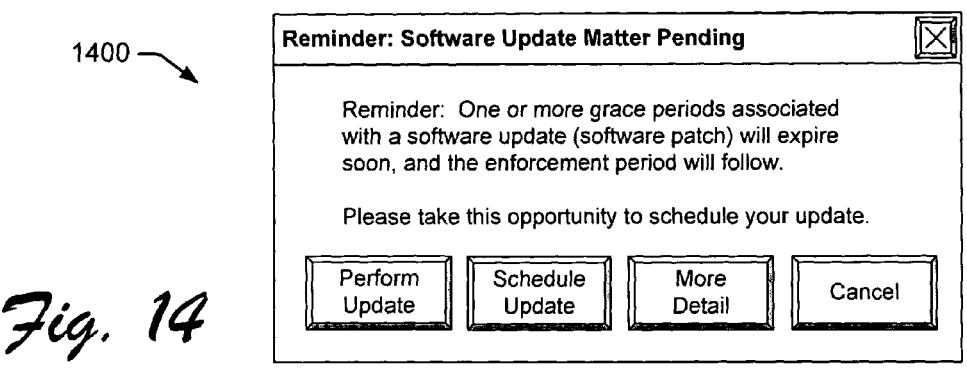
Figure 15:
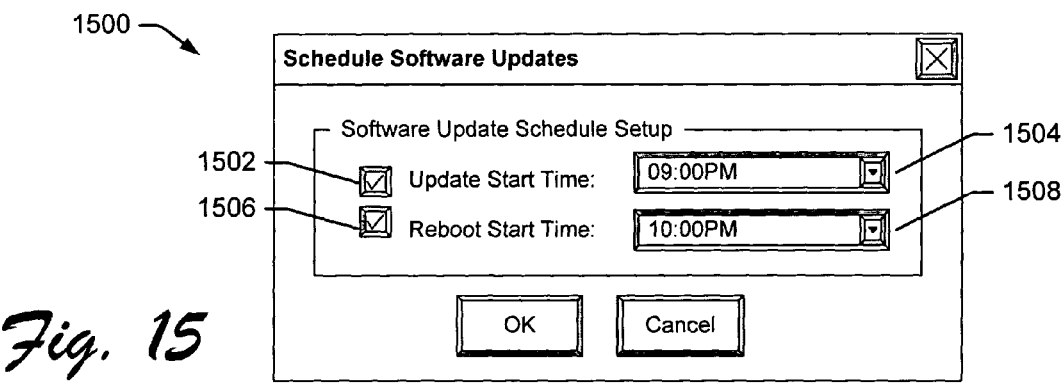

At block 1202, a notification icon is presented to the user at all times for the purpose of allowing the user to gain information about, and control over, the timing and nature of updates to be performed to the user's computer. The icon can be configured to appear similar to a speaker icon, typically found in the lower right of current Windows® operating systems. At block 1204, in an exemplary user interface, right clicking the icon provides the user with an interface 1300 providing a choice of "Display Reminder" and "Install Software Updates" as seen in FIG. 13. At block 1206, selection of the "Display Reminders" button seen in FIG. 13 may result in the exemplary "Reminder" interface 1400 seen in FIG. 14. The interface 1400 of FIG. 14 provides the user with the information that a grace period will expire in the future, and be followed by an enforcement period. By scheduling the updates for a convenient time within the grace period, the user is able to prevent an inconvenient update at the onset of the enforcement period. The user may therefore perform the update immediately (by selecting the first button) or schedule the update to be performed at a time of the user's choice (within the grace period) by pressing the second button. Additional information that will indicate, for example, when the update will be performed as a result of the end of the grace period and the beginning of the enforcement period, may be obtained by pressing the third button labeled "More Detail". Pressing the cancel button allows the user to return to work without resolving or changing the update installation time.

At block 1208, where the user selected the "Install Software Updates" button of FIG. 13 or the "Schedule Update" button of FIG. 14, a user interface 1500 is displayed, which allows the user to schedule the installation of the updates. In the exemplary interface 1500, the user may click a check box 1502 to indicate agreement with the time selected via a pull-down menu 1504 to begin running the updates. Similarly, a check box 1506 may be used to indicate agreement with the time selected via the pull-down menu 1508 to perform a reboot. Alternatively, the pull-down menu 1508 may be used to indicate that the reboot should be performed immediately after update application.

At block 1210, a reminder interface, such as that seen in FIG. 14, may be displayed to the user at reboot or log-in, and periodically during the user's operation of the computer, to inform the user that required updates are pending and that the user may elect to schedule the updates at a convenient time.

Figure 16:
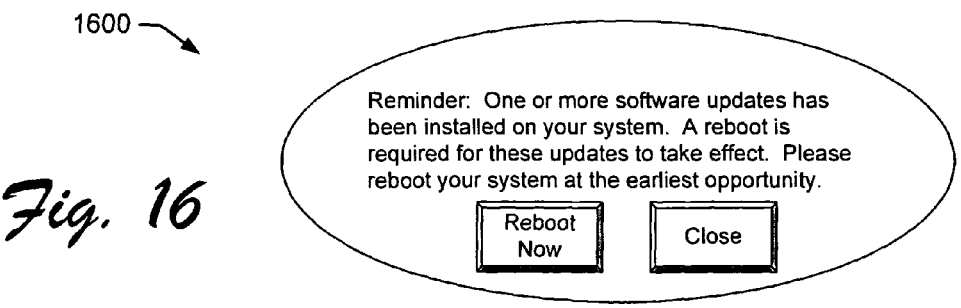

At block 1212, the updates and reboot is performed at according to the user's elected schedule, or automatically, at the end of the grace period. At block 1214, in some instances, a reboot may not be performed. This may result because a document file (e.g. a word processing file) has been left open and unsaved. Alternatively, a reboot may not be performed where the user elected to postpone the reboot in response to an opportunity presented by a user interface. Where no reboot was performed, a repetitive user interface may be used to annoy the user until a reboot is performed. For example, FIG. 16 shows an exemplary annoyance mode interface 1600 which may be configured to repeatedly pop up at intervals to request that the user reboot. Accordingly, at block 1216 the user performs the reboot, thereby bringing the updates into service and ending the annoyance mode.

Figure 17:
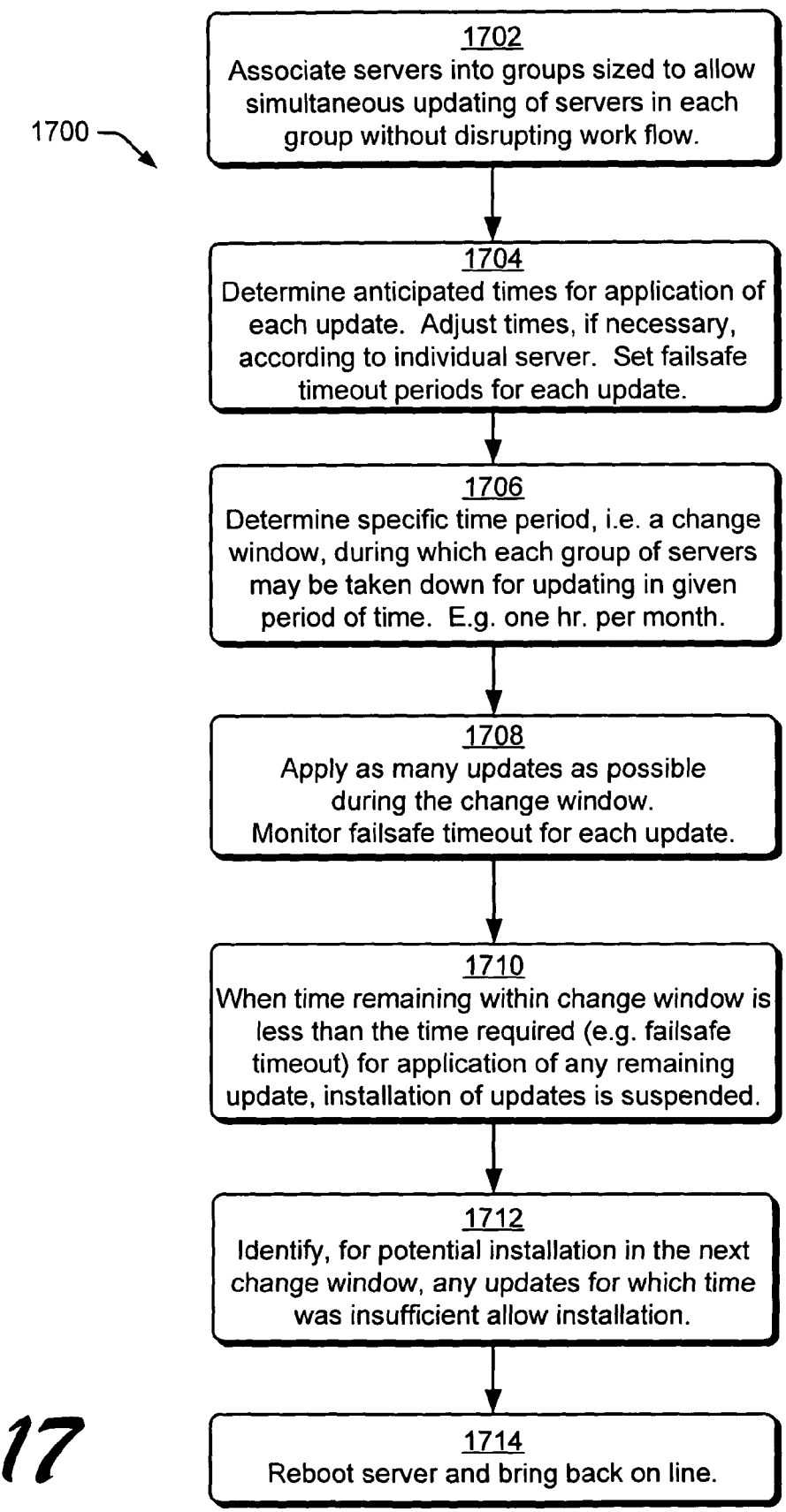
FIG. 17 is a flow diagram describing an exemplary method by which updates may be applied to a large number of systems in an orderly manner.

FIG. 17 is a flow diagram describing an exemplary method 1700 by which updates may be applied to a large number of systems in an orderly manner. For example, hundreds or thousands of servers may be configured to host websites and perform commerce over the Internet. Organizational profitability may require that each server be up and running a set percentage of the time. Accordingly, the method 1700 results in a means by which updates may be applied to each server within a large group of servers within a tightly controlled period of time.

At block 1702, each server within a group of servers to be updated is associated into a subgroup. The subgroups are sized and configured to include servers in a manner which allows the simultaneous updating of servers in each subgroup without disrupting the work flow of the entire group. The time (e.g. 2 am of the first Sunday of each month) when each subgroup may receive updates is assigned.

At block 1704, an anticipated elapsed time required for application of each update to be performed is calculated or measured. Where possible, the anticipated time may be adjusted according to expectations for each server, e.g. longer failsafe timeout period for slower servers. Using the anticipated time for application of each update, failsafe timeout periods are set for each update. For example, where an update is measured to take 5 minutes to install on a test machine, the failsafe timeout period may be set for 10 minutes. Accordingly, where the installation of that update reaches or exceeds 10 minutes, it will be assumed that the installation has failed, and the installation will be terminated with the appropriate success code. As a result, excessive time is not spent on the installation of any update.

At block 1706, the specific time period (i.e. the "change window") during which each subgroup of servers may be taken down for update installation in a given time period may be determined. In an exemplary application, each subgroup may be allocated a specific one-hour time slot of down time each month during which updates may be performed.

At block 1708, during the change window, i.e. the exact period of time having a specific starting and finishing time scheduled for updates, as many updates as possible are applied to the systems within the subgroup. During application of each update, the failsafe time is monitored, and where the failsafe time is exceeded, installation of the update is suspended and an appropriate success code is returned.

At block 1710, when time remaining within the change window is less than the time required for application of any remaining update and for rebooting, the installation of updates is suspended. The time required for application of each update may be based on the failsafe time. Accordingly, the system will be returned to service without exceeding the parameters of the change window.

At block 1712, any updates which failed to install during the change window (because, for example, the change window did not provide enough time to perform their install) are identified for potential installation in the next change window.

At block 1714, the server is rebooted and brought back on line.

Figure 18:
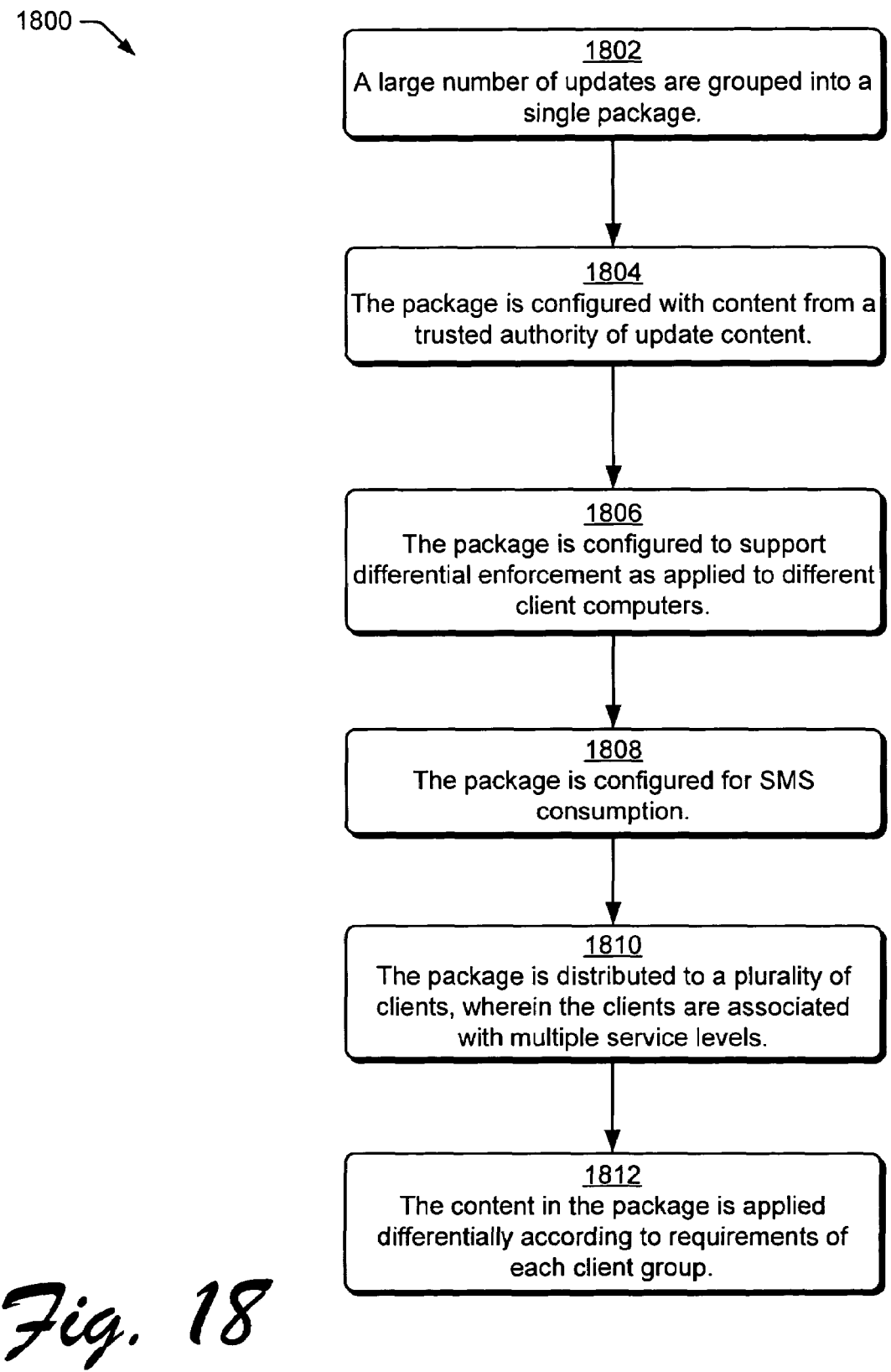
FIG. 18 is a flow diagram describing an exemplary method by which the efficiency of update installation may be improved.

FIG. 18 is a flow diagram describing an exemplary method 1800 by which the efficiency of update installation may be improved by configuring a unit of content—in one example configured within an SMS package—with a large number of updates.

At block 1802, a large number of updates are grouped into a single package. The package may be configured as an SMS package, and the aggregated updates may be considered to be a unit of content.

At block 1804, the package is configured with content obtained from a minimal number of trusted update authorities. In a preferred example, the content is received from a single update authority. By minimizing the number of content providers, the cost of authenticating each provider and each update provided is minimized.

At block 1806, the package is configured to support differential enforcement as applied to different client computers. In one example, an XML document which is included with the updates within the package may provide different rules of enforcement for different client computers. The XML document may recite rules using Boolean operators or other means which result in application of the correct update(s) to each client. Accordingly, clients requiring updates within 24 hours may be treated differently than clients requiring updates within 30 days.

At block 1808, in one example, the package is configured for SMS consumption. Accordingly, at block 1810, SMS distributes the package to a plurality of clients, where the clients are associated with multiple service levels. For example, a more exacting service level may require a greater number of updates which are applied more rapidly after detection; a lower service level may require fewer updates and may provide additional time before they must be applied.

At block 1812, the updates within the package are applied to different client computers in a different manner, according to their service level, the time and duration of their change window, and other factors.

Figure 19:
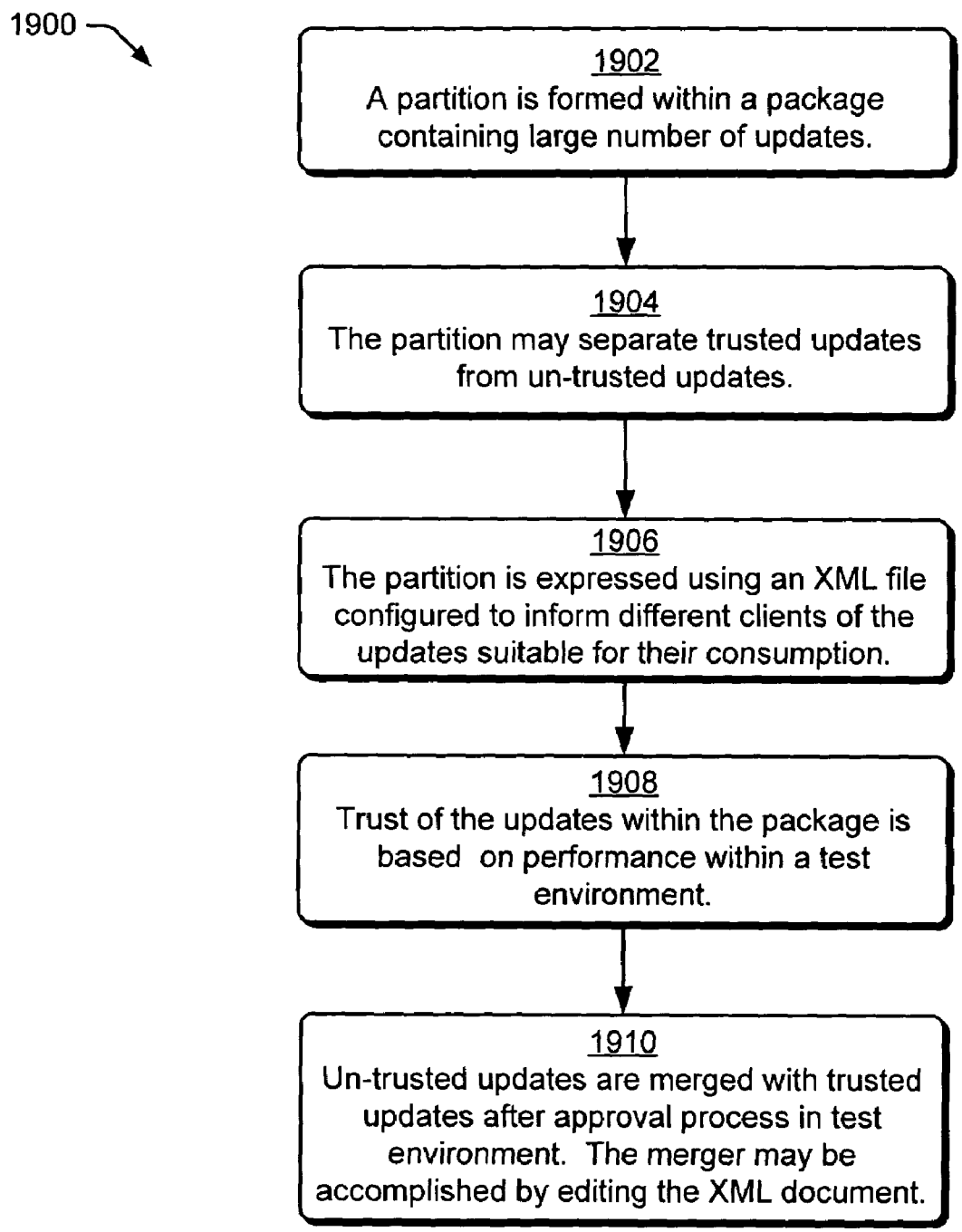
FIG. 19 is a flow diagram describing an exemplary method by which un-trusted updates may be tested and evaluated in an efficient manner.

FIG. 19 is a flow diagram describing an exemplary method 1900 by which un-trusted updates may be tested and evaluated in an efficient manner.

Figure 20:
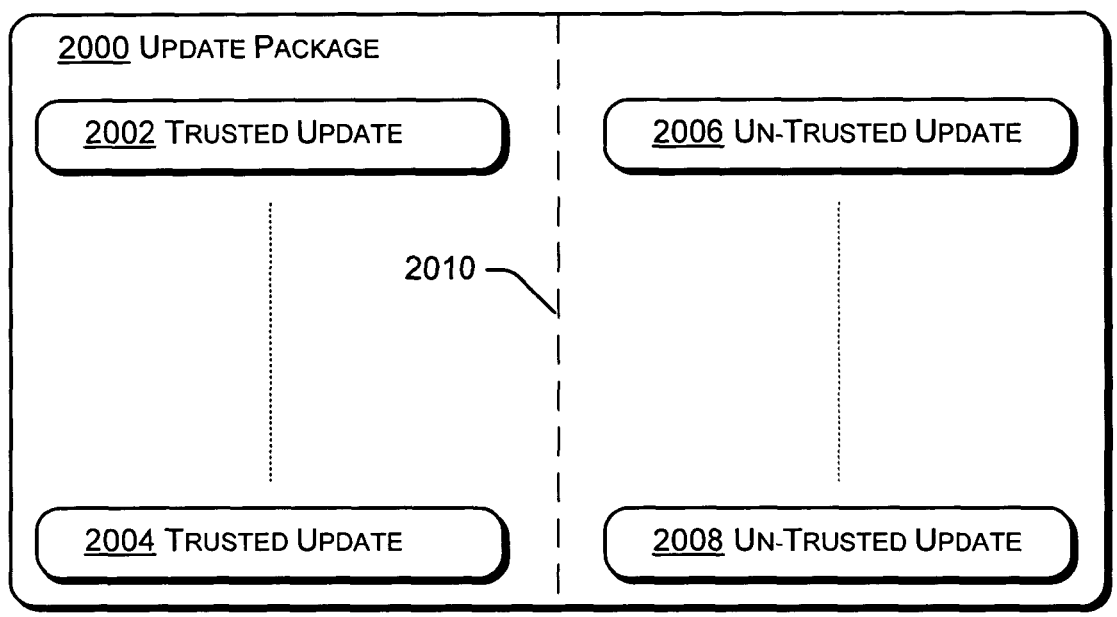
FIG. 20 shows an update package partitioned to divide trusted and un-trusted updates.

At block 1902, a partition is formed in a package, wherein the package typically contains a large number of updates. At block 1904, an exemplary partition separates trusted updates from un-trusted updates. An update may be un-trusted, for example, due to lack of testing. Referring briefly to FIG. 20, the update package 2000 may include trusted updates 2002-2004 and un-trusted updates 2006-2008 separated by a partition 2010. At block 1906, an exemplary partition is expressed using an XML file. The XML file is configured to inform different clients of the updates suitable for their consumption. In particular, the XML file may direct test systems to try un-trusted updates, and may direct production systems to avoid un-trusted updates.

At block 1908, an initial level of trust attributed to each update within the package is based on the performance of that update within a test environment. Following success of an un-trusted update in an appropriate number of systems over an appropriate period of time, the un-trusted update becomes a trusted update. At block 1910, un-trusted updates are merged with trusted updates after approval within the test environment. The merging of an un-trusted update with the trusted updates may be accomplished by editing the XML file which partitions the package.

Figure 21:
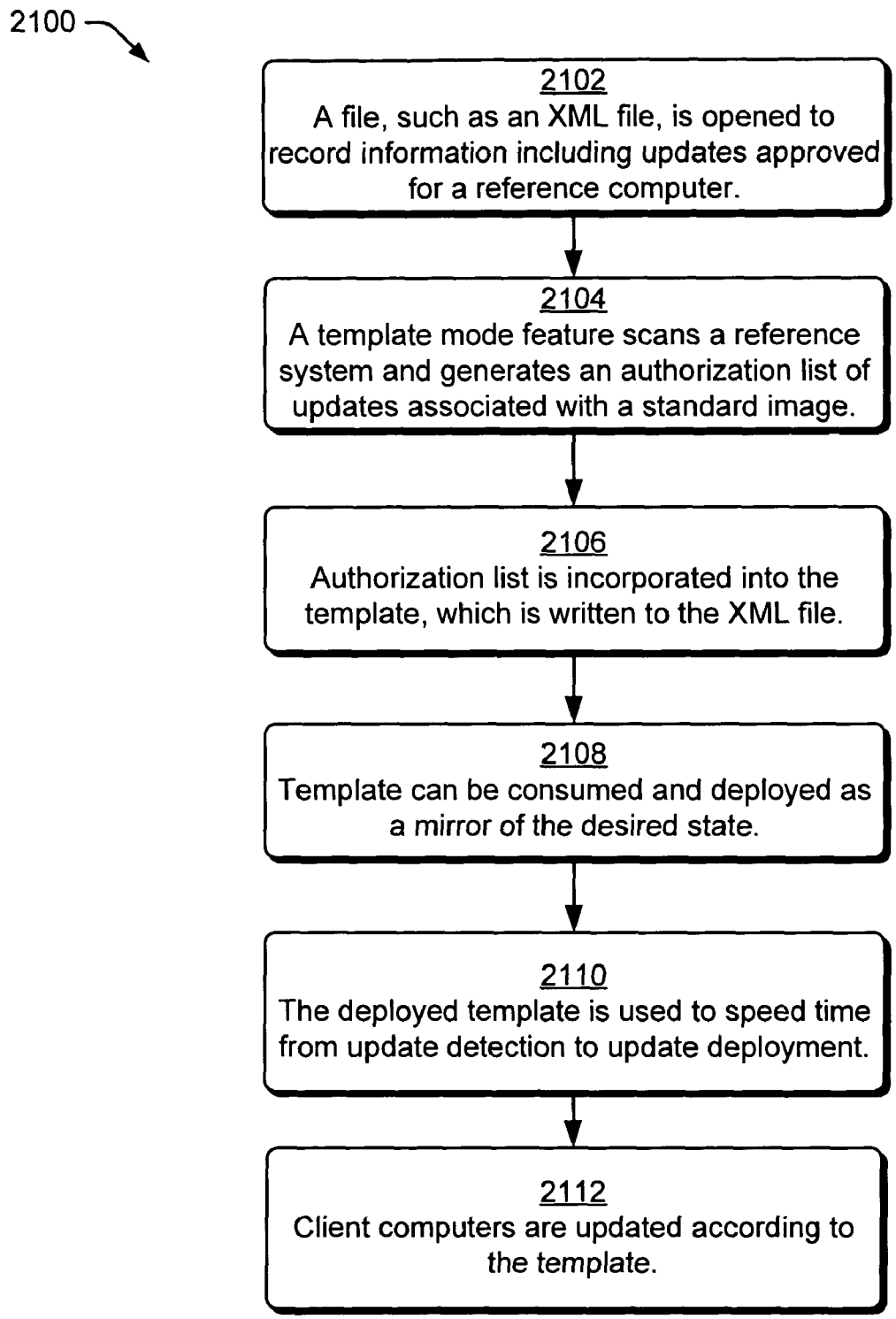
FIG. 21 is a flow diagram describing an exemplary method by which a template may be constructed from a reference computer for use in updating computers having a software configuration based on the reference computer.

FIG. 21 is a flow diagram describing an exemplary method 2100 by which a template may be constructed from a reference computer. The template reflects information on the update level of the reference computer, and facilitates update detection and deployment.

At block 2102, a file, such as a XML file, is opened to record information including updates approved for a reference computer. A reference computer is a computer having a disk with an image that is considered to be a standard within an organization, i.e. the disk contains a standard software configuration utilized by a corporation or other entity. The use of a reference computer simplifies management of systems within an organization by reducing the number of approved configurations allowed. For example, in the event of a problem, the disk may be reformatted with the standard image and the system restarted. At block 2104, in a template mode, a template-making module scans a reference system and generates an authorization list. The authorization list includes all of the updates applied to the standard image on the reference system. At block 2106, the authorization list is incorporated into the template, which is written to the XML file. At block 2108, the template can be consumed and deployed as a mirror of the desired state. At block 2110, the deployed template is used to reduce the time elapsed from update detection to update deployment. Since the template identifies a subset of the updates needed from a large file such as update package 2000 in FIG. 20, the template can reduce the complexity of determining which updates are needed. Accordingly, at block 2112, a client computer is updated according to the template. In the updating process, updates (i.e. "patches") are selected in a more efficient manner by referring to the template, which results in client updating in a manner which is consistent with the organization's reference computer.

Although the disclosure has been described in language specific to structural features and/or methodological steps, it is to be understood that the appended claims are not limited to the specific features or steps described. Rather, the specific features and steps are exemplary forms of implementing this disclosure. For example, actions described in blocks of the flow diagrams may be performed in parallel with actions described in other blocks, the actions may occur in an alternate order, or may be distributed in a manner which associates actions with more than one other block. Moreover, the elements of the methods disclosed may be performed by any desired means, such as by the execution of processor-readable instructions defined on a processor-readable media, such as a disk, a ROM or other memory device, or by operation of an ASIC (application specific integrated circuit) or other hardware device.

The invention claimed is:

1. A processor-readable medium encoded with executable instructions that, when executed, direct a server computer to perform a method for executing software updates on a plurality of client computers, the method comprising:
   assigning, by the server computer, a first level of service to one or more first client computers of the plurality of client computers;
   assigning, by the server computer, a second level of service to one or more second client computers of the plurality of client computers, the levels of service assigned to the first and second client computers specifying information indicating a length of a time period between software update availability and software update installation, wherein the first level of service requires a first length of time for the software updates to be applied after being detected, and the second level of service requires a second length of time for the software updates to be applied after being detected, different from said first length of time;
   scheduling, by the server computer, performance of the software updates to the first and second client computers according to the level of service assigned to each client computer of the first and second client computers, wherein updating of the first client computers assigned the first level of service is scheduled to take place within the first length of time and updating of the second client computers assigned the second level of service is scheduled to take place within the second length of time, different from the first length of time;
   establishing a specified grace period for allowing users to perform the software updates, followed by an enforcement period during which the software updates cannot be postponed, wherein a length of time of the grace period is based at least in part upon the first or second level of service assigned to a particular client computer of the plurality of client computers, wherein the first level of service has a grace period length of time different than the second level of service; and
   initiating, by the server computer, execution of the software updates to the first and second client computers, according to the scheduling.

2. The processor-readable medium of claim 1, wherein the method further comprises:
   configuring on the client computers, by the server computer, a postponement icon that, when displayed by the client computers and selected by user of the client computers, causes the execution of the software updates to be postponed for execution within the established grace period, wherein the grace period is established as a predefined limited window of time within which the users of the client computers are able to elect when the software updates are executed, wherein the grace period is followed by the enforcement period within which selection of the postponement icon is prohibited so that execution of the software updates may not be further postponed, wherein upon ending of the grace period and onset of the enforcement period, the users of the client computers are forced to accept installation of the software updates.

3. The processor-readable medium of claim 2, wherein
   by shortening the grace period, a higher level of service results due to more rapid application of the software updates.

4. The processor-readable medium of claim 2, wherein the method further comprises:
   configuring on a desktop of the particular client computer, by the server computer, an execution icon that, when displayed by the particular client computer and selected by a user, causes the execution of the software updates to be initiated immediately.

5. The processor-readable medium of claim 4, wherein configuring the execution icon comprises:
   enabling the particular client computer to display a recurring reminder to install the software updates during the grace period; and enabling the particular client computer to display the execution icon.

6. The processor-readable medium of claim 5, wherein:
   the recurring reminder comprises information on grace and enforcement periods associated with the software updates scheduled for the particular client computer;
   the grace period is a period during which the execution of the software updates is allowed to be postponed;
   the grace period is configurable by a server administrator; and
   the enforcement period is a period, configured by the server administrator to follow the grace period, during which execution of the software updates is not allowed to be postponed by the user of the particular client computer.

7. The processor-readable medium of claim 5, wherein enabling the particular client computer to display the execution icon comprises:
enabling an update start time to be modified by a user of the particular client computer; and
enabling a client computer reboot time to be modified by a user of the particular client computer, such that an update and a reboot are scheduled at different times.

8. The processor-readable medium of claim 1, wherein method further comprises deploying recurring reminders to the first and second computers after execution of the software updates is completed and reboot has been postponed, reminding users of the first and second client computers to reboot to fully complete update process.

9. The processor-readable medium of claim 1,
wherein the method further comprises the server computer causing a particular client computer of the first or second client computers to automatically perform the software updates during the enforcement period following the termination of the grace period,
wherein the grace period is a specified period of time during which the user of the particular client computer is allowed to postpine execution of the software updates on the particular client computer.

10. The processor-readable medium of claim 1,
wherein the method further comprises enabling a particular client computer of the first or second client computers to delay the execution of the software updates until after conclusion of a user-initiated postponement within the grace period,
wherein the grace period is a specified period of time during which the user of the particular client computer is allowed to postpine execution of the software updates on the particular client computer.
wherein, following expiration of the grace period, the enforcement period begins, during which the user of the particular client computer cannot postpone execution of the software updates.

11. The processor-readable medium of claim 1,
wherein the scheduling comprises establishing change time-window for each client computer, wherein the change time-window defines a period of time within which a client computer will be updated
wherein, when time remaining within the established change time-window for a particular client computer is less than an amount of time required for installing remaining software updates and rebooting of the particular client computer, the installation of the remaining software updates is suspended to return the particular client computer to serivce without exceeding the established change time-window.

12. The processor-readable medium of claim 11, wherein assigning the first or second level of service comprises configuring a duration of the change time-window, wherein a longer duration implies a higher level of service and a shorter duration implies a lower level of service.

13. The processor-readable medium of claim 11, wherein the scheduling further comprises:
defining, by the server, failsafe timeout periods for each of the software updates; and
adjusting, by the server computer, for each of the client computers, the failsafe timeout periods according to performance specifications of each individual client computer, wherein longer failsafe timeout periods are assigned where the individual client computer performance is slower.

14. The processor-readable medium of claim 11, wherein the method further comprises:
applying, by the server computer, updates to each client computer during the change time-window scheduled for each client computer; and
monitoring each failsafe timeout for each update applied to each client computer.

15. The processor-readable medium of claim 11, wherein the method further comprises identifying, by the server computer, updates to a client computer for which there was insufficient time to complete the update within the change time-window, and re-scheduling the update for installation on the client computer within a second change time-window.

16. The processor-readable medium of claim 11, wherein the method further comprises, when time remaining within the change time-window of a client computer is less than a failsafe timeout for any remaining software updates scheduled for installation on the client computer during the time-change window, suspending application of the remaining software updates scheduled to for installation on the client computer.

17. The processor-readable medium of claim 11, wherein the method further comprises the server computer associating the client computers under the server computer's management into groups, wherein each group is assigned a change time-window, and the client computers associated with a particular group inherit the change time-window assigned to the particular group.

18. The processor-readable medium of claim 1, wherein the method further comprises:
grouping a plurality of the software updates into a package comprising a plurality of individual and distinct software updates configured for initialization with a single execution command; and
configuring the package for differential enforcement whereby each of the plurality of client computers receive the same package but different individual ones of the plurality of client computers install different software updates from within the package.

19. The processor-readable medium of claim 18, wherein the method further comprises the server computer programmatically obtaining the plurality of software updates from a trusted source of update content.

20. The processor-readable medium of claim 18, wherein different rules of enforcement for each client computer service level are encoded within the package to result in differential application of the software updates within the package to different client computers based upon the service level assigned to each client computer.

21. The processor-readable medium of claim 18 further comprising partitioning the package of software updates to separate trusted updates from un-trusted updates.

22. The processor-readable medium of claim 21 further comprising merging, by the server computer, one or more un-trusted software updates with the trusted software updates based on performance of the one or more un-trusted updates in a test environment.

23. The processor-readable medium of claim 21, wherein the partitioning is expressed in XML (extensible markup language) configured to inform different individual client computers of updates suitable for their consumption.

24. The processor-readable medium of claim 1, wherein assigning the first level of service or the second level of service to the plurality of client computers comprises: incorporating an authorization list of approved updates into a template, the template based upon an image of a client system with the approved updates installed.

25. The processor-readable medium of claim 24, wherein the template is written into an XML (extensible markup language) document.

26. The processor-readable medium of claim 25, wherein the XML document is consumed and deployed as a mirror of a desired state for software updates.

27. A method for performing software updates on a client computer, the method comprising:
    assigning a level of service to the client computer by a server computer for dtermining a frequency of performing software updates;
    receiving, by the client computer, from the computer, a software update to be executed on the client computer;
    displaying, by the client computer, an icon configured to allow a client computer user a choice between displaying recurring software update reminders and immediate initiation of installation of the software update by the client computer, wherein the recurring software reminders include information on a grace period within which installation of the software update is able to be postponed and information on the onset of an enforcement period after which installation of the software update cannot be postponed, wherein upon ending of the grace period and onset of the enforcement period, the user of the client computer is forced to accept installation of the software update and no longer provided the option to postpone the software update; and
    providing, by the client computer, a user interface to allow user-selection of a time for the client computer to perform the installation of the software update within the server-assigned grace period and to allow user-selection of a time for the client computer to initiate a reboot, separate from the installation and also within the server-assigned grace period, wherein the times selected for the grace period and enforcement period are based in part on the level of service assigned to the client computer by the server computer.

28. A processor-readable medium comprising processor-executable instructions that, when executed, direct a client computer to execute a method for updating software on the client computer, the method comprising:
    assigning a level of service to the client computer for determining a frequency of performing software updates;
    displaying, by the client computer, a desktop icon that represents a choice between displaying recurring software update reminders and initiating immediate installation of software updates, wherein the recurring software update reminders include information on a grace period within which installation of the software updates by the client computer is able to be postponed and information on the onset of an enforcement period after which installation of the software updates by the client computer cannot be postponed, wherein upon ending of the grace period and onset of the enforcement period, the user of the client computer is forced to accept installation of the software update and no longer provided the option to postpone the software update; and
    providing, by the client computer, a user interface to allow user-selection of a time within the grace period for the client computer to perform the installation of the software updates and to allow user-selection of a time within the grace period and distinct from the time for the client computer to perform the installation, for the client computer to initiate a reboot, wherein the times selected for the grace period and enforcement period are based at least in part on the level of service assigned to the client computer.

29. The processor-readable medium of claim 28, wherein the method further comprises;
    providing at repeated intervals, by the client computer, a user interface to facilitate the reboot of the client computer, where the software updates have been installed, the installation package has completed execution, and no reboot has been performed.

30. The processor-readable medium of claim 28, wherein the method further comprises;
    setting the grace period and the enforcement period to facilitate determining the level of service provided to the client computer, wherein a shorter grace period indicates a higher level of service providing more frequent updates.

31. The processor-readable medium of claim 28, wherein the method further comprises periodically displaying, by the client computer, information about software updates that are available and have not yet been performed on the client computer.

32. A method executed by a server computer for performing software updates on a group client computers associated with the server computer, the method comprising:
    assigning a level of service to each client computer of the group of client computers for determinig a frequency of performing software updates;
    associating individual ones of the group client computers into subgroups sized to allow simultaneous updating of the client computers in each subgroup without disrupting work flow of the entire group of client computers;
    calculating an anticipated elapsed time required for application of each software update to be performed, while adjusting the anticipated time according to expectations for each client computer in each subgroup;
    setting failsafe timeout periods for applying each software update based the anticipated time for completion of each software update, wherein installation is assumed to have failed and installation is terminated when the installation of a particular software update exceeds the failsafe timeout period set for the particular software update;
    establishing a change time-window for each of the subgroups, wherein the change time-window establishes a specific time period for updating the client computers in each subgroup during which the client computers in the subgroup may be taken down for update installation without disrupting the work flow of the entire group;
    initiating, by the server computer, software updates to each client computer of a particular subgroup, wherein the initiating is performed for the particular subgroup the change time-window established for the particular subgroup; and
    monitoring, by the server computer, the failsafe timeout period for each software update on each client computer of the particular sybgroup during installation of the software updates, wherein, when the failsafe update is exceeded for a particular software update, the particular software update is suspended and a corresponding code is returned; and
    when time remaining within the established change time-window is less than an amount of time required for installing remaining software updates and rebooting of the client computers in the particular subgroup, the installation of the remaining software updates is suspended to return the particular subgroup to service without exceeding the established change time-window.

33. A processor-readable medium encoded with executable instructions that, when executed, direct a server computer to perform a method for updating client computer software on a group of client computers, the method comprising:

assigning a level of service to each client computer of the group of client computers for determining a frequency of performing software updates;

associating individual ones of the plurality of client computers into subgroups sized to allow simultaneoud updating of the client computers in each subgroup without disrupting work flow of the entire group of client computers;

calculating an anticipated elapsed time required for application of each software update to be performed, while adjusting the anticipated time according to expectations for each client computer in each subgroup;

setting failsafe timeout periods for applying each software update based the anticipated time for completion of each software update, wherein installation is assumed to have failed and installation is terminated when the installation of a particular software update exceeds the failsafe timeout period set for the particular software update;

establishing, for each of the subgroups, a particular change time-window, wherein the change time-window establishes a specific time period for updating the client computers in each subgroup during which the client computers in the subgroup may be taken down for update installation without disrupting the work flow of the entire group; and initiating, by the server computer, software updates to each of the client computers associated with a particular one of the subgroups, wherein the initiating is performed within the particular change time-window established for the particular one of the subgroups;

monitoring, by the server computer, the failsafe timeout for each update on each client computer associated with the particular one of the subgroups during installation of the software updates, wherein, when the failsafe timeout period is exceeded for a particular software update, the particular software update is suspended and a corresponding code is returned; and when time remaining within the established change time-window is less than an amount of time required for installing remaining software updates and rebooting of the client computers in the particular subgroup, the installation of the remaining software updates is suspended to return the particular subgroup to service without exceeding the established change time-window.

34. The processor-readable medium of claim 33, the method further comprising:

identifying, by the server computer, uninstalled software updates for installation in a second change time-window, wherein the unistalled software updates for installation in the second change time-window were scheduled for installation in the particular change time-window for the particular subgroup, but were not installed in the particular subgroup during the particular change time-window; and installing the unistalled software updates during the second change time-window.

35. A method executed by a server computer for performing software updates to a plurality of client computers, the method comprising:

assigning, by the server computer, a first level of service to one or more first client computers of the plurality of client computers, assigning, by the server computer, a second level of service to one or more second client computers of the plurality of client computers, the levels of service assigned to the first and second client computers specifying information indicating a length of a time period between software update availability and software update installation, wherein the first level of service requires a first length of time for the software updates to be applied after being detected, and the second level of service requires a second length of time for the software updates to be applied after being detected, different from said first length of time;

scheduling, by the server computer, performance of the software updates to the first and second client computers according to the level of service assigned to each client computer to the first and second client computers, wherein updating of the first client computers assigned the first level of service is scheduled to take place within the first length of time and updating of the second client computers assigned the second level of service is scheduled to take place within the second length of time, different from the first length of time;

establishing a specified grace period followed by an enforcement period for performing the software updates based at least in part upon the first or second level of service assigned to a particular client computer of the plurality of client computers, wherein the first level of service has a different grace period than the second level of service;

initiating, by the server computer, execution of the software updates to the first and second client computers, according to the scheduling; and configuring on the first and second client computers, by the client computer, a postponement icon that, when displayed by the particular client computer and selected by users of the client computer, causes the execution of the software updates to be postponed for execution within the established grace period, wherein the specified grace period is established as a predefined limited window of time within which the users of the client computers elect when the software updates are executed, wherein the grace period is followed by the enforcement period within which selection of the postponement icon is prohibited so that execution of the software updates may not be further postponed, wherein upon ending of the grace period and onset of the enforcement period, the users of the client computers are forced to accept installation of the software updates.

36. A method implemented by a server computer for performing software updates on a plurality of client computers, the method comprising:

assigning a level of service to each client computer of the plurality of client computers for determining a frequency of performing software updates, wherein a first level of service requires a first length of time in which the software updates are to be applied after being detected, and the second level of service requires a second length of time during which the software updates are to be applied after being detected, different from said first length of time;

using a particular client computer of the plurality of client computers as a reference client computer, wherein the reference client computer has a standard image representing the plurality of client computers used to generate a template of approved updates for facilitating update detection and deployment;

establishing a file to record information including approved updates approved for the reference client computer;

scanning the reference client computer in a template mode to generate a list of the approved updates to be applied to the standard image on the reference client computer;

incorporating the list of the approved updates into the template, wherein the approved updates needed for the plurality of client computers are a subset of updates indentified from a larger update package;

deploying the template to the plurality of client computers; and initiating software updates to the plurality of client computers according to the template and the assigned level of service.

37. A processor-readable medium encoded with executable instructions that, when executed, direct a server computer to perform a method for updating client computer software on a plurality of client computers, the method comprising:

assigning a level of service to each client computer of the plurality of client computers for determining a frequency of performing software updates, wherein a first level of service requires a first length of time in which the software updates are to be applied after being detected, and the second level of service requires a second length of time during which the software updates are to be applied after being detected, different from said first length of time;

using a particular client computer of the plurality of client computers as a reference client computer, wherein the reference client computer has a standard image representing the plurality of client computers used to generate a template of approved updates for facilitating update detection and deployment;

establishing a file to record information including updates approved for the reference client computer;

scanning the reference client computer in a template mode to generate a list of the approved updates to be applied to the standard image on the reference client computer;

incorporating the list of the approved updates into the template, wherein the approved updates needed for the plurality of client computers are a subset of updates indentified from a larger update package;

deploying the template of approved updates to the plurality of client computers; and initiating software updates to the plurality of client computers according to the template of approved updates and the assigned level of service.

38. The processor-readable medium of claim 37, the method further comprising:

incorporating the template of approved updates into the file, wherein the file is an XML (extensible markup language) file.

39. A processor-readable medium comprising processor-executable instructions that, when executed by a processor, instruct the processor to perform a method for performing software updates, the method comprising:

assigning a level of service to each client computer of a plurality of client computers for determining a frequency of performing software updates;

receiving a plurality of software updates from a trusted website;

grouping a subset of the plurality of software updates into a package;

partitioning the package to divide trusted ones of the software updates from un-trusted ones of the software updates;

distributing the package to a plurality of client-computers;

associating the plurality of client-computers into groups;

establishing a change time-window for each of the groups;

expressing to each particular one of the plurality of client-computers, which software updates in the package are suitable and trusted for consumption by the particular client-computer;

installing updates on each of the plurality of clients within the change time-window established for the group the client is a member of;

installing the un-trusted software updates only on client-computers configured to install un-trusted software updates;

setting a failsafe timeout for each installation on each client computer with reference to an anticipated duration of installation of each software update on each client computer;

monitoring the failsafe timeout for each software update on each particular client computer;

determining if the failsafe timeout for each software update on a particular client computer is greater than time remaining within the change time-window for update installation on the particular client computer, and if so, suspending installation of the software update on the particular client computer.

* * * * *